(12) United States Patent
Hashimoto et al.

(10) Patent No.: US 8,452,742 B2
(45) Date of Patent: May 28, 2013

(54) SOFTWARE CONFIGURATION MANAGEMENT METHOD AND SYSTEM

(75) Inventors: Koji Hashimoto, Bellevue, WA (US); Fumio Narisawa, Hitachinaka (JP); Kentaro Yoshimura, Hitachi (JP); Tomohito Ebina, Hitachi (JP); Junji Miyake, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 145 days.

(21) Appl. No.: 12/920,350

(22) PCT Filed: May 28, 2009

(86) PCT No.: PCT/JP2009/059788
§ 371 (c)(1),
(2), (4) Date: Nov. 19, 2010

(87) PCT Pub. No.: WO2010/013538
PCT Pub. Date: Feb. 4, 2010

(65) Prior Publication Data
US 2011/0055153 A1    Mar. 3, 2011

(30) Foreign Application Priority Data
Jul. 29, 2008 (JP) ................................ 2008-195353

(51) Int. Cl.
*G06F 7/00* (2006.01)
*G06F 17/00* (2006.01)

(52) U.S. Cl.
USPC .......................................... 707/695; 707/797

(58) Field of Classification Search
USPC ................... 707/695, 999.203, 797; 717/170
See application file for complete search history.

(56) References Cited

U.S. PATENT DOCUMENTS

| | | | | |
|---|---|---|---|---|
| 7,934,210 | B1* | 4/2011 | Stampfli et al. | 717/168 |
| 8,117,293 | B1* | 2/2012 | Anderson | 709/223 |
| 2002/0138820 | A1* | 9/2002 | Daly | 717/126 |
| 2004/0075683 | A1* | 4/2004 | Savage | 715/741 |
| 2005/0027797 | A1* | 2/2005 | San Andres et al. | 709/203 |
| 2005/0044531 | A1* | 2/2005 | Chawla et al. | 717/122 |
| 2005/0210445 | A1* | 9/2005 | Gough et al. | 717/111 |
| 2007/0240152 | A1* | 10/2007 | Li et al. | 717/174 |
| 2007/0294667 | A1* | 12/2007 | Caceres et al. | 717/120 |
| 2008/0209399 | A1* | 8/2008 | Bonnet et al. | 717/122 |

FOREIGN PATENT DOCUMENTS

| | | |
|---|---|---|
| JP | 05-216636 | 8/1993 |
| JP | 08-221261 | 8/1996 |
| JP | 2007-102380 | 4/2007 |
| JP | 2007-279883 | 10/2007 |
| JP | 2008-165497 | 7/2008 |

* cited by examiner

*Primary Examiner* — Apu Mofiz
*Assistant Examiner* — Bryan Walker
(74) *Attorney, Agent, or Firm* — Antonelli, Terry, Stout & Kraus, LLP.

(57) ABSTRACT

It is possible to surely commit a revision made on a software component in a software component database and a software product group and to create a new software product from the same database. Provided is a software configuration management system which includes a software component database and a software product management unit and accepts data transmission/reception from a software component database management client and a software product operation client. The software configuration management system further includes: a component-product correspondence table, component-file correspondence information, a synchronization unit for mutually committing a modification of the software component database and a modification of a software product; update information; and a correspondence table update unit.

8 Claims, 25 Drawing Sheets

FIG. 4

```xml
<Group name="MicrowaveOven">
  <src>
    <File path="/src/include/MicrowaveOven.h" />
  </src>
  <subGroups>
    <Group name="Sensors">
      <subGroups>
        <Group name="WeightSensor cardinality="1..1">
          <src>
            <File name="Weight.h" path="/src/Sensors/Weight/Weight.h" />
          </src>
          <features>
            <Feature name="BooleanWeight>
              <src>
                <Text name="initWeight" path="/src/Sensors/Weight/Weight.c">
void initWeight() {
  int ret = initDI();
  if (ret != OK) {
            :
} int initDI() {
            :
}
</text>
                <Text name="getWeight" path="/src/Sensors/Weight/Weight.c">
int getWeight() {
            :
}
</text>
              </src>
            </Feature>
            <Feature name="AnalogWeight>
              <src>
                <Text name="initWeight" path="/src/Sensors/Weight/Weight.c">
void initWeight() {
  int ret = initADC();
  if (ret != OK) {
            :
} int initADC() {
            :
}
</text>
                <Text name="getWeight" path="/src/Sensors/Weight/Weight.c">
int getWeight() {
            :
}
</text>
              </src>
            </Feature>
                            :
```

FIG. 5

| Node ID | Type | Cardinality | Parent node |
|---|---|---|---|
| MicrowaveOven | Group | - | - |
| Sensors | Group | 1..1 | MicrowaveOven |
| Actuators | Group | 0..* | MicrowaveOven |
| WeightSensor | Group | - | Sensors |
| StartButton | Feature | - | Sensors |
| Beeper | Feature | - | Actuators |
| Light | Feature | - | Actuators |
| BooleanWeight | Feature | - | WeightSensor |
| AnalogWeight | Feature | - | WeightSensor |

| Software component ID | Path | Contents | Parent node |
|---|---|---|---|
| : | : | | : |
| BooleanWeight/initWeight | /src/Sensors/Weight/Weight.c | void initWeight() {<br>  int ret = initDI();<br>  if (ret != OK) {<br>    :<br>  }<br><br>  int initDI() {<br>    :<br>  } | BooleanWeight |
| BooleanWeight/getWeight | /src/Sensors/Weight/Weight.c | int getWeight() {<br>  :<br>} | BooleanWeight |
| AnalogWeight/initWeight | /src/Sensors/Weight/Weight.c | void initWeight() {<br>  int ret = initADC();<br>  : | AnalogWeight |
| AnalogWeight/getWeight | /src/Sensors/Weight/Weight.c | | AnalogWeight |
| : | : | | : |

FIG. 6

| Software component ID | Product |
|---|---|
| MicrowaveOven/main | Product A, Product B, Product C |
| MicrowaveOven/include | Product A, Product B, Product C |
| AnalogWeight/common | Product A, Product B, Product C |
| StartButton/common | Product A, Product B, Product C |
| BooleanWeight/initWeight | Product C |
| BooleanWeight/getWeight | Product C |
| AnalogWeight/initWeight | Product A, Product B |
| AnalogWeight/getWeight | Product A, Product B |
| StartButton/initStartButton | Product A, Product B, Product C |
| StartButton/stateChanged | Product A, Product B, Product C |
| Beeper/initBeeper | Product A, Product B, Product C |
| Beeper/beep | Product A, Product B, Product C |
| Light/initLight | Product A, Product C |
| Light/controlLight | Product A, Product C |

FIG. 7

| Software component ID | Product ID | Update date and time |
|---|---|---|
| AnalogWeight/initWeight | Product A | 2008/03/19 11:19:47 |
| AnalogWeight/getWeight | Product A | 2008/03/19 11:19:47 |
| BooleanWeight/initWeight | Product C | 2008/02/04 17:02:11 |
| : | : | |

FIG. 8

| Software component ID | File | Start line | End line |
|---|---|---|---|
| AnalogWeight/initWeight | /src/Sensors/Weight/Weight.c | 4 | 36 |
| AnalogWeight/getWeight | /src/Sensors/Weight/Weight.c | 38 | 51 |
| : | : | | |

FIG. 9

```
#include <include/MicrowaveOven.h>
#incluce "Weight.h"
/* @begin(id='AnalogWeight/initWeight') */                901 void initWeight() {
  int ret = initADC();
  if (ret != OK) {
            :

} int initADC() {
            :
}
/* @end */                                                902

/* @begin(id='AnalogWeight/getWeight')*/                  903 int getWeight() {

:

}
/* @end */                                                904
```

FIG. 26

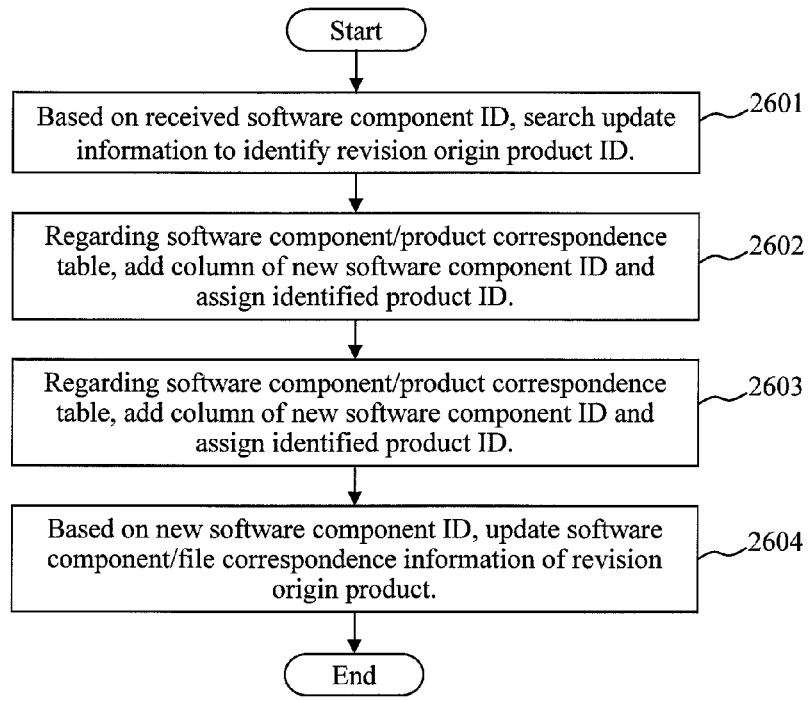

FIG. 27

| Software component ID | Product |
|---|---|
| MicrowaveOven/main | Product A, Product B, Product C |
| MicrowaveOven/include | Product A, Product B, Product C |
| AnalogWeight/common | Product A, Product B, Product C |
| StartButton/common | Product A, Product B, Product C |
| BooleanWeight/initWeight | Product C |
| BooleanWeight/getWeight | Product C |
| AnalogWeight/initWeight | Product B |
| AnalogWeight/getWeight | Product B |
| StartButton/initStartButton | Product A, Product B, Product C |
| StartButton/stateChanged | Product A, Product B, Product C |
| Beeper/initBeeper | Product A, Product B, Product C |
| Beeper/beep | Product A, Product B, Product C |
| Light/initLight | Product A, Product C |
| Light/controlLight | Product A, Product C |
| NewAnalogWeight/initWeight | Product A |
| NewAnalogWeight/getWeight | Product A |

2701
2702
2703
2704

```
#include <include/MicrowaveOven.h>
#incluce "Weight.h"

/* @begin(id='NewAnalogWeight/initWeight') */                    ~811 void initWeight() {
  int ret = initADC();
  if (ret != OK) {
           :
  }
} int initADC() {
           :
}

/* @end */

/* @begin(id='NewAnalogWeight/getWeight')*/                      ~821 int getWeight() {

:

}

/* @end */
```

FIG. 34

| Software component ID | Product |
|---|---|
| MicrowaveOven/main | Product A, Product B, Product C |
| MicrowaveOven/include | Product A, Product B, Product C |
| AnalogWeight/common | Product A, Product B, Product C |
| StartButton/common | Product A, Product B, Product C |
| BooleanWeight/initWeight | Product C |
| BooleanWeight/getWeight | Product C |
| AnalogWeight/initWeight |  |
| AnalogWeight/getWeight | Product A, Product B |
| StartButton/initStartButton | Product A, Product B, Product C |
| StartButton/stateChanged | Product A, Product B, Product C |
| Beeper/initBeeper | Product A, Product B, Product C |
| Beeper/beep | Product A, Product B, Product C |
| Light/initLight | Product A, Product C |
| Light/controlLight | Product A, Product C |
| AnalogWeight/ConversionMode/initWeightCommon | Product A, Product B |
| AnalogWeight/ConversionMode/Continuous/initWeight | Product B |
| AnalogWeight/ConversionMode/OneShot/initWeight | Product A |

```
#include <include/MicrowaveOven.h>
#incluce "Weight.h"                                        811
/* @begin(id='AnalogWeight/ConversionMode/initWeightCommon') */ void initWeight() {
  int ret = initADC();
  if (ret != OK) {
        :

}                                                          811
int initADC() {
/* @begin(id='AnalogWeight/ConversionMode/Continuous/initWeight') */
   /* set Continuous Mode */
        :                                                  821
/* @end */
}

/* @end */

/* @begin(id='AnalogWeight/getWeight')*/ int getWeight() {

:

}

/* @end */
```

SOFTWARE CONFIGURATION MANAGEMENT METHOD AND SYSTEM

TECHNICAL FIELD

The present invention relates to an automatic program configuration apparatus which retrieves a plurality of software components from a software component database storing existing software components, and combines them to automatically create a source code of a new product program, and particularly to configuration management of the above described software component database and product groups.

BACKGROUND ART

In general, when new software is developed, a copy of a source file that has been formerly developed is utilized. A copied file may be utilized as it is, or a copied file may be utilized in a revised form.

In this way, software utilizes other software, but it itself may also be utilized in the development of other software. That is, software utilizes other software as a derivation origin file, but it also can be utilized as a derivation origin file by other software.

Software may be revised after it has been developed. At this time, if the revised content is one that should be committed to a derivation destination file, the content needs to be surely committed to the derivation destination file. Moreover, if the revised content is one that should be committed in a derivation origin file, the content needs to be surely committed in the derivation origin file. For example, the revised content is a correction of a bug, the revised content needs to be committed to all other derivation files. That is, maintenance management of software is needed.

JP Patent Publication (Kokai) No. 2007-279883 describes a file configuration management apparatus which retains a correspondence relationship between a derivation origin file and a derivation destination file to prevent a failure to commit revisions between files which are in the correspondence relationship.

However, the file configuration management apparatus according to JP Patent Publication (Kokai) No. 2007-279883 performs the configuration management only in the unit of files and is unable to perform the configuration management in the unit of software components that make up a file. Here, a software component represents an arbitrary set of text strings such as functions, procedures, statements, and the like included in a source file.

In recent years, upon development of new software, a plurality of software components are retrieved from a software component database which stores existing software components, and they are combined to automatically create a source file of a new program.

However, in this case, maintenance work of the software component database becomes necessary. For example, when a bug is found in a software component stored in the software component database, it is necessary to revise the bug and replace the software component with a revised one. Moreover, a new software component may be added to the software component database. In particular, when the software components stored in the software component database becomes large in number, the maintenance work thereof will become complicated.

JP Patent Publication (Kokai) No. 2007-102380 describes that a plurality of software components stored in a software component database is managed by use of a macro description. Thereby, replacement with a revised software component can be automated.

[Patent Document 1] JP Patent Publication (Kokai) No. 2007-279883

[Patent Document 2] JP Patent Publication (Kokai) No. 2007-102380

DISCLOSURE OF THE INVENTION

Problems to be Solved by the Invention

However, JP Patent Publication (Kokai) No. 2007-102380 does not present any configuration management method of the software component database and the software products created from the database. That is, the patent document does not present a method of committing a revision of a software component to a software product that uses the software component when the software component included in a software component database is revised. Moreover, it also does not present a method of adding a new software component to a software component database.

In order to mutually commit a revision of a software component between a software component database and s software product group created from the database, it is conceivable to retain a correspondence relationship of software components as in JP Patent Publication (Kokai) No. 2007-279883.

However, when a new software component is added to the software component database or a software component is divided, it is necessary to update the correspondence relationship of software components. Moreover, a source file making up a software product is made up of a plurality of software components, and each software component is inserted into any location in the source file. Therefore, it is necessary to maintain the correspondence relationship between the software components and the source file in each software product. Moreover, it is necessary to update the correspondence relationship according to an addition of a new software component, and the like. Further, in order to create a new software product form the software component database, software component configuration information for selecting/retrieving a necessary software component from the software component database is needed. Therefore, it is also necessary to update the software component configuration information according to an addition of a new software component to the software component database.

It is an object of the present invention to enable the commitment of a modification that is made on a software component to a software component database and a software product group, and to enable the creation of a new software product from the software component database in a configuration management system of a software component database and a software product group, even after a new software component is added to the software component database or a software component is divided.

Means for Solving the Problems

According to the present invention, a software configuration management system includes a software component database which stores a software component that is a constituent element of a source file for making up a software product as a tree structure, and stores the software component in correspondence with a configuration information element that makes up the tree structure, and a software product management unit which stores a plurality of software products that are created by combining software components stored in the software component database, and accepts transmission/reception of data from a software component database management client which manages the software component database from outside, and a software product operation client which manages the software product management unit from outside.

The software configuration management system of the present invention comprises:

a component/product correspondence table which records the relationship between a software component and a software product including the software component for all the software components stored in the software component database;

component/file correspondence information which records information for determining the relationship between a software component included in a software product and a source file for each of the software products stored in the software product management unit;

a synchronization unit which commits a modification of the software component database to a software product stored in the software product management unit, or commits a modification of a software product stored in the software product management unit to the software component database, based on the component/product correspondence table and the component/file correspondence information according to an instruction from the software component database management client or the software product operation client;

update information which records histories of modifications of software components being mutually committed by the synchronization unit; and a correspondence table update unit which updates the software components stored in the software component database, the component/product correspondence table, the update information, and the component/file correspondence information in response to an instruction from the software component database management client.

Advantages of the Invention

According to the present invention, even when a new software component is added to a software component database, or a software component is divided, revisions made on a software component can be surely committed to the software component database and the software product group created from the database, and also a new software product can be created from the database.

BRIEF DESCRIPTION OF THE DRAWINGS

FIG. 4 illustrates an example in which the content of a software component database of a software configuration management server according to the present invention is described in XML.

FIG. 5 illustrates an example in which the content of a software component database of a software configuration management server according to the present invention is displayed by a relational database table.

FIG. 6 illustrates an example of a soft compartment/product correspondence table of the software configuration management server according to the present invention.

FIG. 7 illustrates an example of update information of the software configuration management server according to the present invention.

FIG. 8 illustrates an example of software component/file correspondence information of the software configuration management server according to the present invention.

FIG. 9 illustrates an example in which software component/file correspondence information of the software configuration management server according to the present invention is embedded in a source file.

FIG. 26 illustrates an example of the processing to add a software component modified in the software component database to the software component database as a new software component, in the correspondence table update unit of the software configuration management server according to the present invention.

FIG. 27 illustrates an example of the software component/product correspondence table updated by the correspondence update unit in the software configuration management server according to the present invention.

FIG. 34 illustrates an example of a software component/product correspondence table updated by the correspondence table update unit in the software configuration management server according to the present invention.

FIG. 35 illustrates an example of software component/file correspondence information updated by the correspondence table update unit in the software configuration management server according to the present invention.

DESCRIPTION OF SYMBOLS

Figure 1:
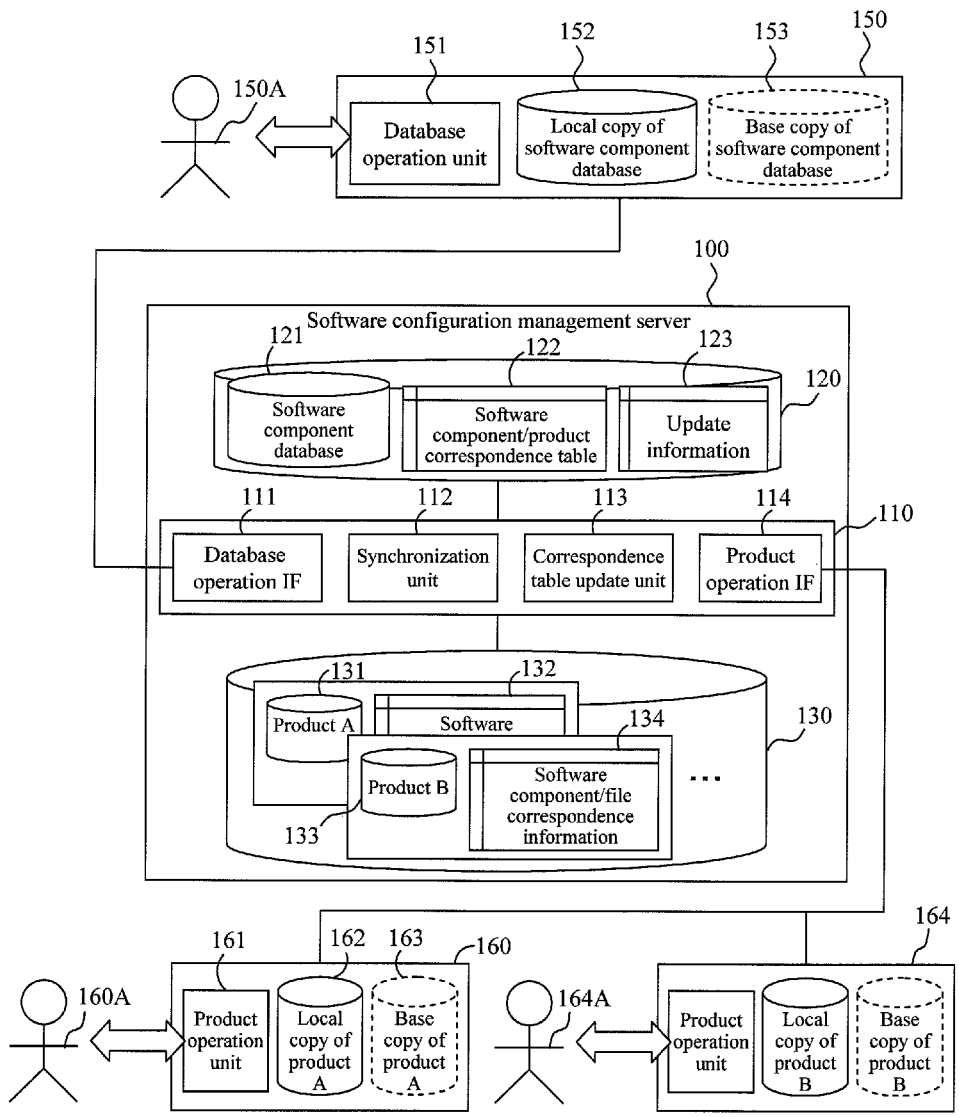
FIG. 1 illustrates an example of functional blocks of a software configuration management system according to the present invention.

100 Software configuration management server
110 Configuration management unit
111 Database operation IF
112 Synchronization unit
113 Correspondence table update unit
114 Product operation IF
120 Software component database management unit
121 Software component database
122 Software component/product correspondence table
123 Update information
130 Software product management unit
131 Software product A
132 Software component/file correspondence information corresponding to software product A
133 Software product B
134 Software component/file correspondence information corresponding to software product B
150 Software component database management client
150A Software component database manager
151 Database operation unit
152 Local copy of software component database
153 Base copy of software component database
160 Software product operation client
160A Developer of software product A
161 Product operation unit
162 Local copy of software product A
163 Base copy of software product A Best Mode for Carrying Out the Invention Referring to FIG. 1, an example of a software configuration management system according to the present invention will be described. The software configuration management system of the present example includes a software configuration management server 100, a software component database management client 150, and software product operation clients 160 and 164. The software component database management client 150 and software product operation clients 160 and 164 may be present in plural in number.

The software configuration management server 100 includes a configuration management unit 110, a software component database management unit 120, and a software product management unit 130. The configuration management unit 110 includes a database operation IF 111, a synchronization unit 112, a correspondence table update unit 113, and a product operation IF 114. The software component database management unit 120 includes a software component database 121, a software component/product correspondence table 122, and update information 123. A plurality of software components are stored in the software component database 121. A software component, which is a constituent element of a source file which makes up a software product, represents a set of arbitrary text strings, such as functions, procedures, statements, and the like included in a source file.

The software product management unit 130 manages a plurality of software products created from software components stored in the software component database 121. To be more specific, the managing is performed such that each software product is paired with a source file group making up that software product. In the example shown in FIG. 1, software component/file correspondence information 132 corresponds to a software product 131 and software component/file correspondence information 134 corresponds to a software product 133.

The software component database manager 150A manages the software component database 121 by using a software component database management client 150. Modifications of the software component database 121 include two types of modifications: that is, an outgoing modification and an incoming modification.

An outgoing modification is one that is created by the software component database manager 150A subjecting a software component to editing processing via the software component database management client 150. An incoming modification is one that is caused by a modification of the software product 131, 133 stored in the software product management unit 130. That is, when the software product 131 or 133 stored in the software product management unit 130 is modified, such modification is automatically committed to software components stored in the software component database 121 of the software component database management unit 120. The latest content is stored in the software component database 121 by a synchronization processing by the synchronization unit 112. That is the incoming modification.

A method of creating an outgoing modification of the software component database 121 will be described. The software component database manager 150A makes a copy of the latest content of the software component database 121 via a database operation unit 151 of the software component database management client 150, and stores it in the client 150. This is referred to as a local copy 152. On the other hand, a first copy of the content of the software component database 121 to the software component database management client 150 is referred to as a base copy 153. When performing an outgoing modification, the local copy 152 is used and the base copy 153 is not used. The software component database manager 150A edits the local copy 152 and commits the edited content to the software component database 121 via the database operation unit 151. Thus, an outgoing modification is made.

Comparing the local copy 152 with the base copy 153 will allow the detection of outgoing modifications of the software component database 121. Comparing the latest content of the software component database 121 with the base copy 153 will allow the detection of incoming modifications. The latest content of the software component database 121 is sometimes referred to as a remote copy. Comparing the remote copy with the base copy 153 will allow the detection of incoming modifications. Such comparison method is referred to as a 3-way comparison. When an outgoing modification of the software component database 121 is detected, it is committed to the base copy 153 and the software product 131, 133. When an incoming modification of the software component database 121 is detected, it is committed to both the base copy 153 and the local copy 152.

A software product developer 160A manages the software product 131, 133 by using a software product operation client 160. The modification of the software product 131, 133 stored in the software product management unit 130 includes two types: an outgoing modification and an incoming modification.

An outgoing modification is one that is created by the software product developer 160A editing a software product via the software product operation client 160. An incoming modification is one that is caused by a modification of a software component stored in the software component database 121 of the software component database management unit 120. That is, when a modification of the software component stored in the software component database 121 is made, such modification is automatically committed to the software product 131, 133 stored in the software product management unit 130. When one software product 131 stored in the software product management unit 130 is modified, such modification is automatically committed to other software product 133 stored in the software product management unit 130. In the software product 131, 133 stored in the software product management unit 130, the latest content is stored through a synchronization processing by the synchronization unit. This is an incoming modification.

A method of creating an outgoing modification of the software product 131 will be described. The software product developer 160A copies the latest content of the software product 131 via a product operation unit 161 of the software product operation client 160, and stores it in the software product operation client 160. This is referred to as a local copy 162. On the other hand, a first copy of the content of the software product 131 to the software product operation client 160 is referred to as a base copy 163. When performing an outgoing modification, the local copy is used and the base copy 163 is not used. The software product developer 160A edits the local copy 162 and commits the edited content to the software product 131 via the product operation unit 161. Thus, an outgoing modification of the software product 131 is made.

Comparing the local copy 162 with the base copy 163 allows the detection of outgoing modifications of the software product 131. Comparing the latest content of the software product 131 with the base copy 163 allows the detection of incoming modifications of the software product 131. The latest content of the software product 131 is sometimes referred to as a remote copy. Comparing the remote copy with the base copy 163 allows the detection of incoming modifications. Such comparison method is referred to as a 3-way comparison. When an outgoing modification of the software product 131 is detected, it is committed to both the base copy 163 and the software component database 121. When an incoming modification of the software product 131 is detected, it is committed to both of the base copy 163 and the local copy 162.

According to the present invention, an outgoing modification of the software component database 121 created by the software component database management client 150 automatically leads to an incoming modification of the software product 131, 133 stored in the software product management unit 130.

An outgoing modification of the software product 131 created by the software product operation client 160 automatically leads to an incoming modification of software components stored in the software component database 121 and the other software product 133 stored in the software product management unit 130.

It is noted that in order to perform the version management of the software component database 121, a software component/product correspondence table 122, update information 123, software products 131, 133, and software component/file correspondence information 132 and 134, an existing version management system such as CVS and Subversion may be used as the software component database management unit 120 and the software product management unit 130. In this case, as the software product operation clients 160 and 164, a client program for the version management system can be used as it is. On the other hand, concerning the software component database management client 150, one according to the present invention will be used.

Figure 2:
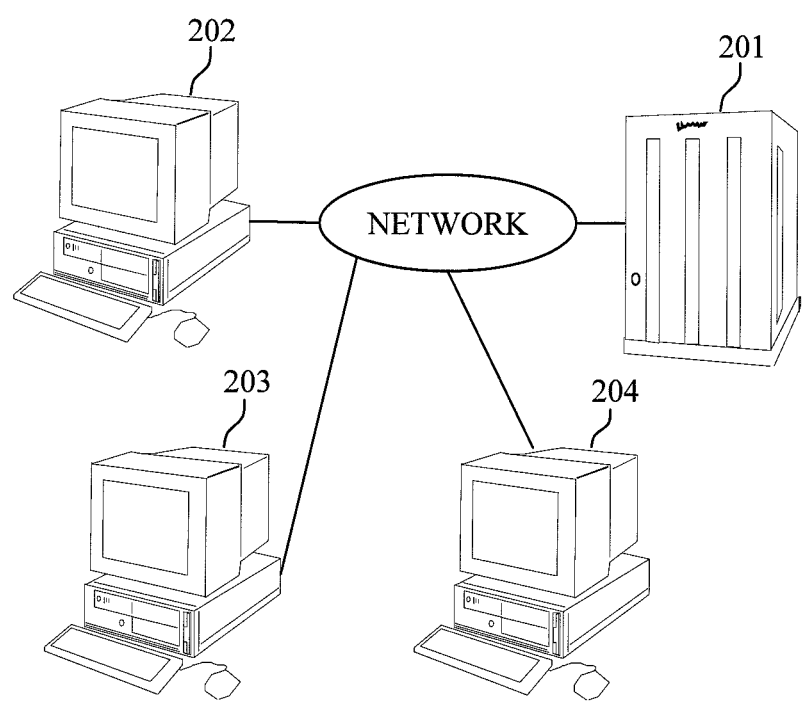
FIG. 2 illustrates a hardware configuration example of the software configuration management system according to the present invention.

FIG. 2 illustrates an example of the hardware configuration of a software configuration management system of the present invention. This example shows a case in which the software configuration management server 100 in FIG. 1 is installed in a server 201, the software component database management client 150 is installed in a computer 202, and the software product operation clients 160 and 164 are installed in computers 203 and 204, respectively. However, the software component database management client 150 and the software product operation client 160 may be installed in the same computer. Moreover, the configuration management unit 110, the software component database management unit 120, and the software product management unit 130 making up a configuration management server 100 may be installed in different servers respectively.

Figure 3:
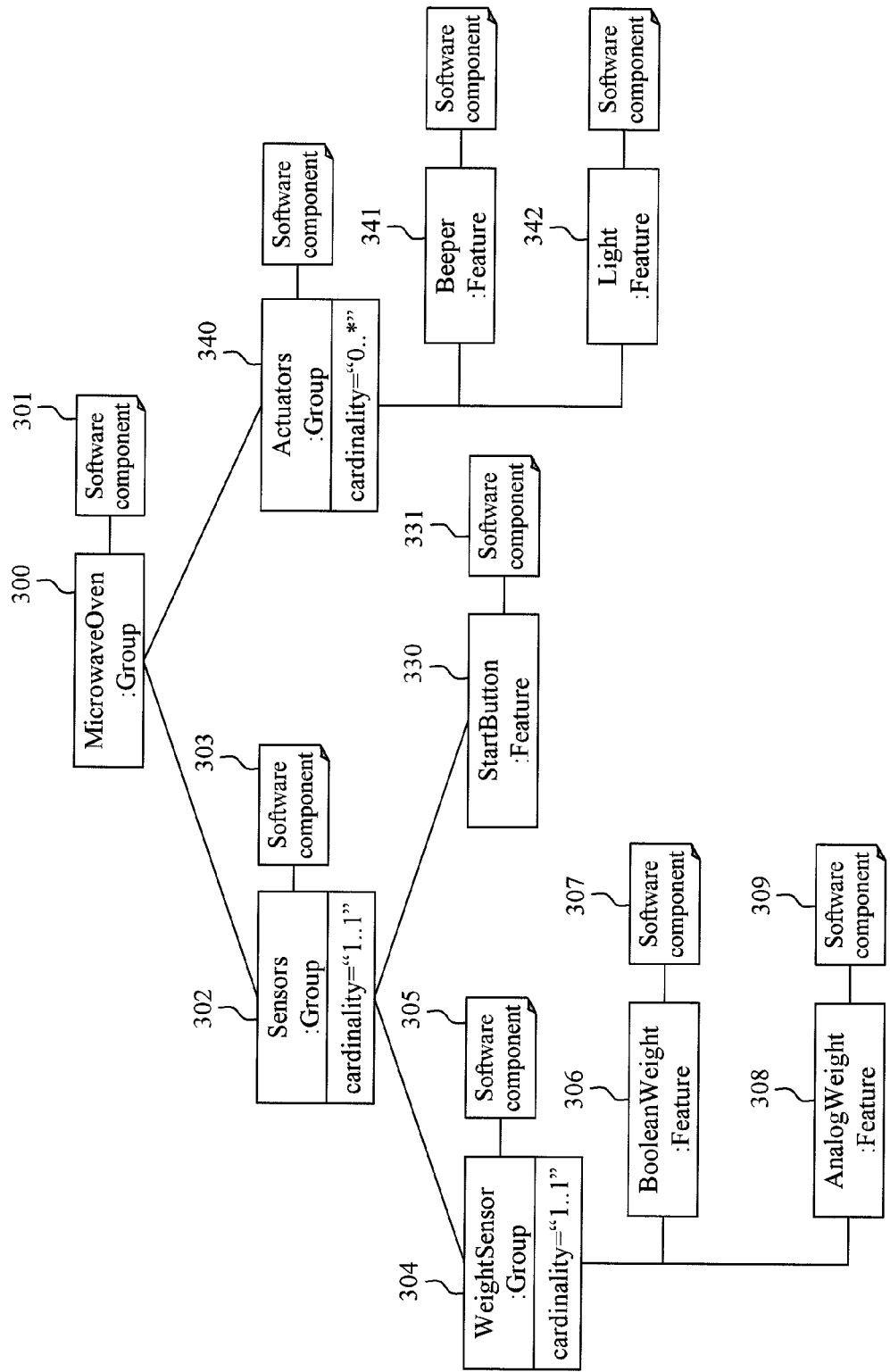
FIG. 3 illustrates an example of the representation by a logical tree structure of a software component database of the software configuration management server according to the present invention.

FIG. 3 illustrates an example of the data structure of the software component database 121 of the software configuration management server 100 of FIG. 1. According to the present example, all the software components included in the software component database 121 are managed by a single tree. The tree is made up of nodes 300, 302, 304, 306, and 308 and in boxes representing each node, "node ID", "type", and further "cardinality" are shown. For example, the node ID of the node 306 is "BooleanWeight", while the node ID of the node 304 is "WeightSensor". The type of the node 306 is "Feature", while the type of the node 304 is "Group". A "Group" type node represents a group which integrates lower nodes.

A node represents options. If a node is selected, a software component corresponding to the node is retrieved from the software component database 121. Therefore, this tree structure is utilized as the configuration information of the software components. For example, when a new software product is created, desired nodes are selected. When the node 306 is selected, the software component 307 is retrieved from the software component database 121, and when the node 308 is selected, the software component 309 is retrieved from the software component database 121. The retrieved software components 307 and 309 are integrated into a source file for making up the new software product.

The nodes 306 and 308 are included in "Group" type node 304. Even when either of the nodes 306 and 308 is selected, a software component 305 corresponding to the node 304 is retrieved from the software component database 121. The retrieved software component 305 is integrated into a source file making up the new software product as a common component.

As so far described, the software component database 121 has a tree structure for managing software components. Therefore, when creating a software product, the software component database 121 has an important role to provide information of software components which make up that product.

FIG. 4 illustrates an example of the description in XML of the data structure of the software component database 121 shown in FIG. 3. XML is a markup language in which a user can define a tag of its own. It is noted that as the markup language for describing the software component database 121 of the present example, SGML, etc. other than XML may be used.

FIG. 5 illustrates an example of the representation by using a relational database of the software component database 121 shown in FIG. 3. The table of FIG. 5A shows the relationship among the node ID, type, cardinality, and parent node ID. The table of FIG. 5B shows the relationship among the software component ID, path, contents, and parent node ID. The Parent node ID shows nodes of upper hierarchical levels in the tree structure of FIG. 3.

FIG. 6 illustrates an example of the software component/ product correspondence table 122 of the software configuration management server 100 of FIG. 1. The software component/product correspondence table 122 indicates the relationship between a software component ID and a software product which uses the software component. This example indicates that software products A, B, and C are created by utilizing the software component database 121 shown in FIG. 3. For example, the software component corresponding to the software component ID "Light/initLight" is used in the software products A and C.

Searching the software component/product correspondence table 122 with a software component ID as the search key enables the identification of a software product group including the software component. Therefore, utilizing the software component/product correspondence table 122 enables the management of the histories of software products created by utilizing software components stored in the software component database 121.

FIG. 7 illustrates an example of the update information 123 of the software configuration management server 100 of FIG. 1. The update information 123 indicates the relationship among the software component ID, software products, and update time and date of the software component. This example indicates that the content of the software component corresponding to the software component ID "AnalogWeight/ initWeight" stored in the software component database 121 is committed from the software product A at 11:17:47, Mar. 19, 2008. The update information 123 manages the update histories of software components stored in the software component database 121, which are performed based on the modification of the software products.

FIG. 8 illustrates an example of the software component/ file correspondence information 132 and 134 of the software configuration management server 100 of FIG. 1. The software component/file correspondence information indicates the relationship among the software component ID, the source file including the software component, and the start and end lines of the source file. This example shows that the software component corresponding to the software component ID "AnalogWeight/intitWeight" is the 4-th line to the 36-th line of the source file "/src/Sensors/Weight/Weight.c".

FIG. 9 illustrates an example of a source file embedded with software component/file correspondence information. In this example, annotations 901 to 904 are inserted at the head and tail of each software component. These annotations include software component IDs. Therefore, interpreting these annotations enables the identification of the correspondence between the software component and the source file.

Next, the case in which the software product developer 160A performs the management of the software products will be described. When the software product developer 160A modifies the source file of the soft product 131 stored in the software product management unit 130 of FIG. 1, the modified content is committed to the software component of the software component database 121 and further committed to other software products 133 stored in the software product management unit 130. Hereafter, concurrently with the description of the processing, operation of each unit making up the software configuration management system of the present invention will be described in detail.

Figure 10:
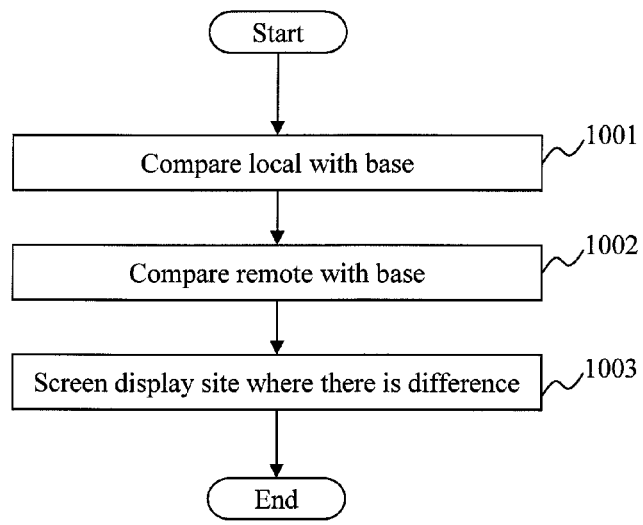
FIG. 10 illustrates an example of the processing, in a product operation unit of a software product operation client according to the present invention, to retrieve the difference between the local copy of a software product in the software product operation client and the software product in a software product management unit.

FIG. 10 illustrates an example of the processing to detect and to display an outgoing modification and an incoming modification of the software product 131 stored in the software product management unit 130. The software product developer 160A inputs an instruction to execute the processing to detect an outgoing modification and an incoming modification of the software product 131 at the software product operation client 160. Thereby, the product operation unit 161 of the software product operation client 160 performs the following processing. At step 1001, the product operation unit 161 compares the local copy 162 with the base copy 163 to detect an outgoing modification from the difference therebetween. Next, at step 1002, the product operation unit 161 compares the software product 131 (remote copy) stored in the software product management unit 130 with the base copy 163 to detect an incoming modification from the difference therebetween. Lastly, at step 1003, the product operation unit 161 displays a screen as shown in FIG. 11.

Figure 11:
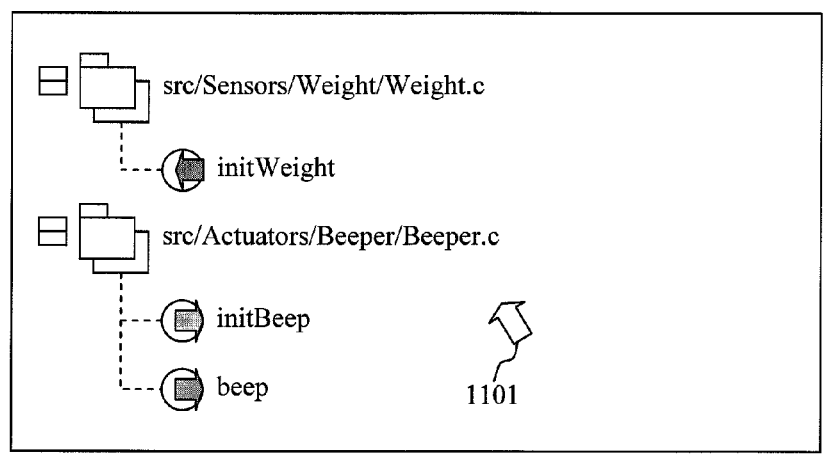
FIG. 11 illustrates a screen example to display, in the product operation unit of a software product operation client according to the present invention, the result of the retrieval of the difference between the local copy of a software product in the software product operation client and the software product in a software product management unit.

FIG. 11 illustrates an example of a screen to show the detection result of an outgoing modification and incoming modification of a software product. The screen of FIG. 11 is created by the product operation unit 161 at step 1003 of FIG. 10. This example indicates that outgoing modifications have been detected in software component IDs "intitBeep" and "beep" corresponding to a source file "src/Actuators/Beeper/Beeper.c" of the local copy 162. As illustrated, the rightward arrow indicates an outgoing modification. Moreover, the example indicates that an incoming modification is detected in a software component ID "initWeight" corresponding to a source file "src/Sensors/Weight/Weight.c" of the software product 131. As illustrated, a leftward arrow indicates an incoming modification. Moreover, on the screen shown in FIG. 11, when the software product developer 160A designates the software component ID "initWeight" by a mouse pointer 1101 and instructs details display, a screen shown in FIG. 12 is displayed.

In FIG. 11, when the software product developer 160A designates the software component for which an incoming modification has been made using the mouse pointer 1101 and to instruct the commitment to the local copy 162 and the base copy 163, the product operation unit 161 retrieves a software product from the software product management unit 130 and commits it to the local copy 162 and the base copy 163. In FIG. 11, when the software product developer 160A designates the software component for which an outgoing modification has been made using the mouse pointer 1101 to instruct commitment to the base copy 163, the software component database 121, and other software products stored in the software product management unit 130, the product operation unit 161 executes the processing shown in FIGS. 13 and 14.

Figure 12:
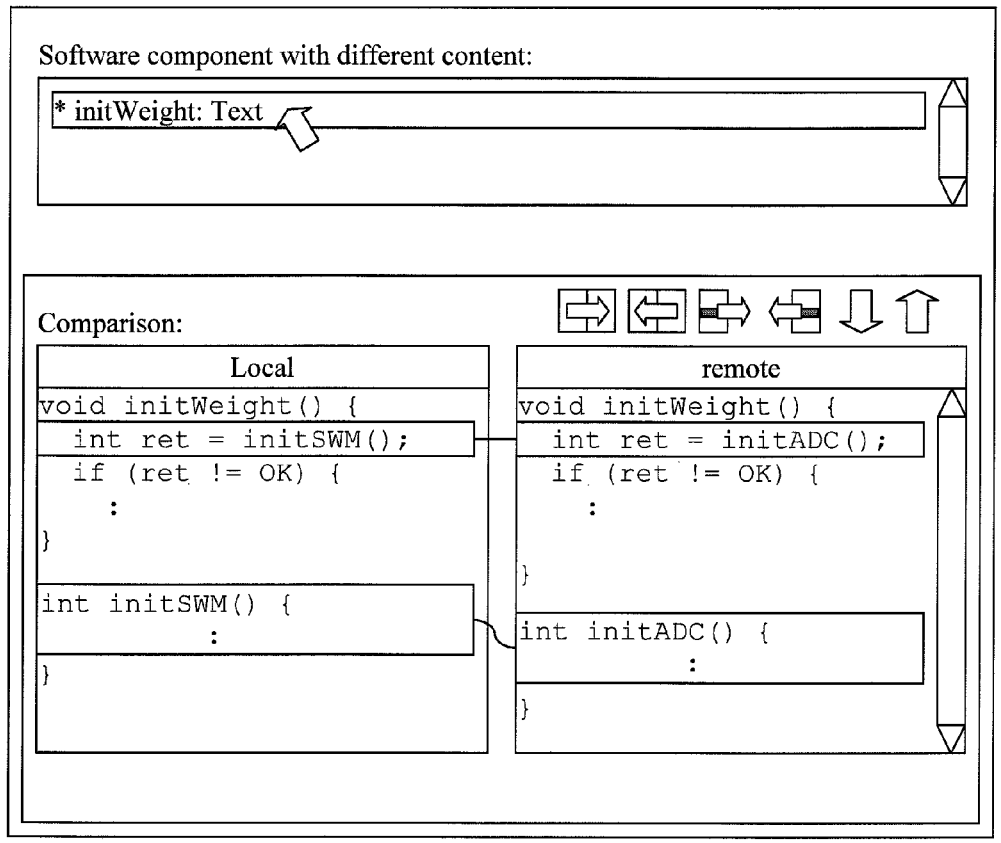
FIG. 12 illustrates a screen example to display the details of a difference part of a software component in the product operation unit of the software product operation client, or the data base operation unit of the software component database management client according to the present invention.

FIG. 12 illustrates an example of the screen showing details of a software component ID "initWeight" for which an incoming modification has been detected. The screen of FIG. 12 is displayed when in the screen of FIG. 11, the software product developer 160A designates the software component ID "initWeight" and instructs details display with the mouse pointer 1101.

Figure 13:
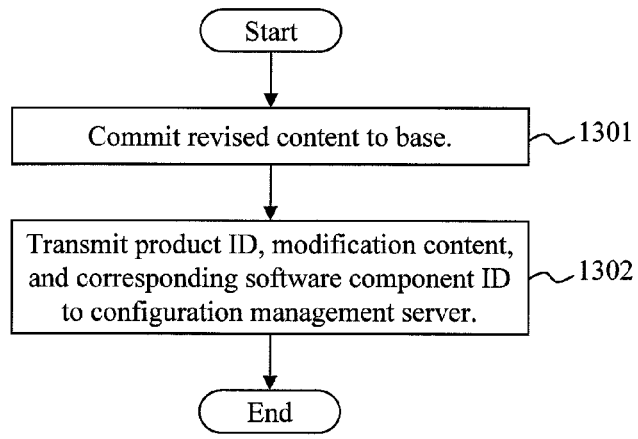
FIG. 13 illustrates an example of the processing to commit a revised content in a software product to a software component database in the product operation unit of the software product operation client according to the present invention.

FIG. 13 illustrates an example of the processing in the product operation unit 161 to commit an outgoing modification of a software product to the base copy, the software component database 121 and other soft products stored in the software product management unit 130. The processing of FIG. 13 is executed when in FIG. 11, the software product developer 160A designates the software component for which an outgoing modification has been performed with the mouse pointer 1101 and instructs the commitment to the software component database 121 and the base copy 163. At step 1301, the product operation unit 161 commits the outgoing modification included in the designated software component to the base copy 163. That is, the outgoing modification included in the local copy 162 is committed to the base copy 163. Next, at step 1302, the software product ID, software component ID, and the content of software component are transmitted to a product operation IF 114 of the software configuration management server 100. The product operation IF 114 of the software configuration management server 100 receives the software product ID, software component ID, and the content of software component designated by the software product operation client 160. Next, the synchronization unit 112 of the software configuration management server 100 commits the revised content of the software component to the software component database 121 according to the processing shown in FIG. 14.

Figure 14:
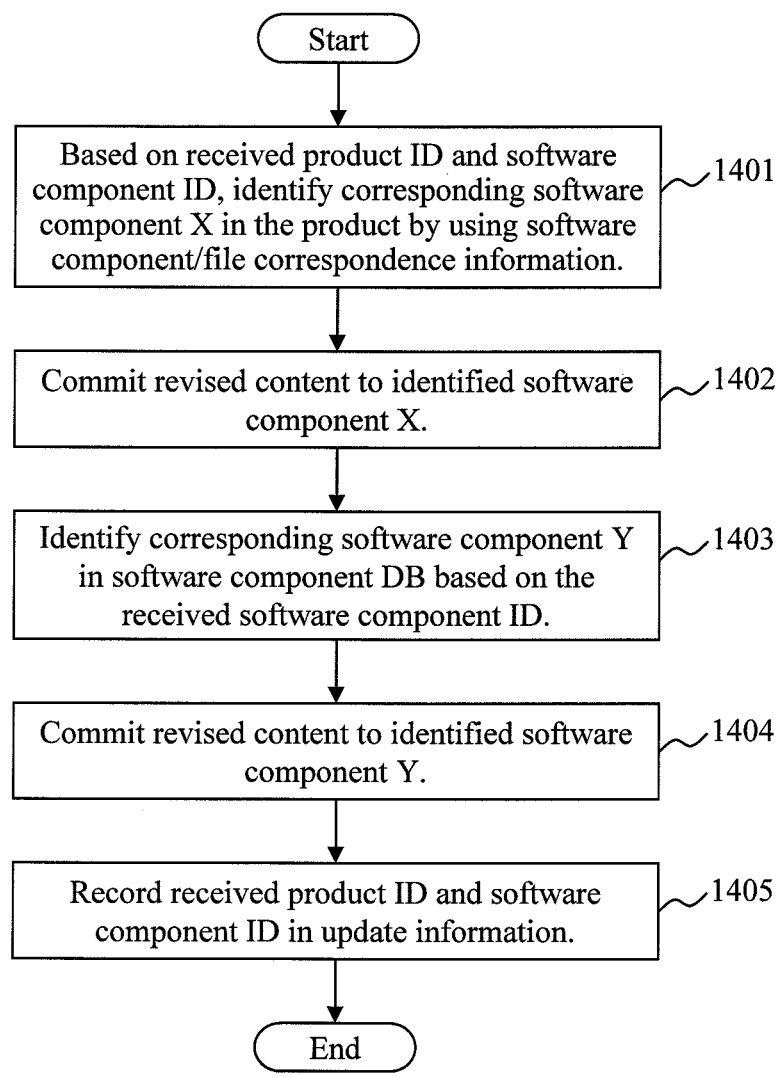
FIG. 14 illustrates an example of the processing to commit a revised content in a software product to a software component database in a synchronization unit of the software configuration management sever according to the present invention.

FIG. 14 illustrates an example of the processing to commit an outgoing modification of a software product to the software component database 121 and other software products stored in the software product management unit 130. This processing is executed by the synchronization unit 112 of the software configuration management server 100. At step 1401, the synchronization unit 112 searches the software component/product correspondence table 122 with the designated software product ID and the software component ID as the search key. That is, all the software products including the designated software component ID are detected from the software products stored in the software product management unit 130, and further a software component "X" included in the software products is detected. Next, at step 1402, the synchronization unit 112 commits the content of the designated software component to the software component "X" stored in the software product management unit 130.

Next, at step 1403, the synchronization unit 112 searches the software component/product correspondence table 122 with the designated software component ID as the search key. That is, all the software products including the designated software component ID are detected from the software components stored in the software component database 121 to detect a software component "Y" included in the software products. At step 1404, the synchronization unit 112 commits the content of the designated software component to the software component "Y" stored in the software component database 121.

Lastly, the received software product ID and the software component ID are recorded with a current time in the update information 123.

Suppose, for example, that the software product developer 160A designates a software component ID "beep" on the screen shown in FIG. 11. At step 1402, all the software products including the software component ID "beep" are retrieved from the software products stored in the software product management unit 130, and an outgoing modification is committed thereto. Moreover, at step 1404, all the software components including the software component ID "beep" of the software components stored in the software component database 121 are retrieved, and an outgoing modification is committed thereto.

Next, a case in which the software component database manager 150A performs the management of the software component database 121 will be described. When the software component database manager 150A detects a modification of the software product 131 stored in the software product management unit 130, the modification content is committed to other software products 133 stored in the software product management unit 130.

Figure 15:
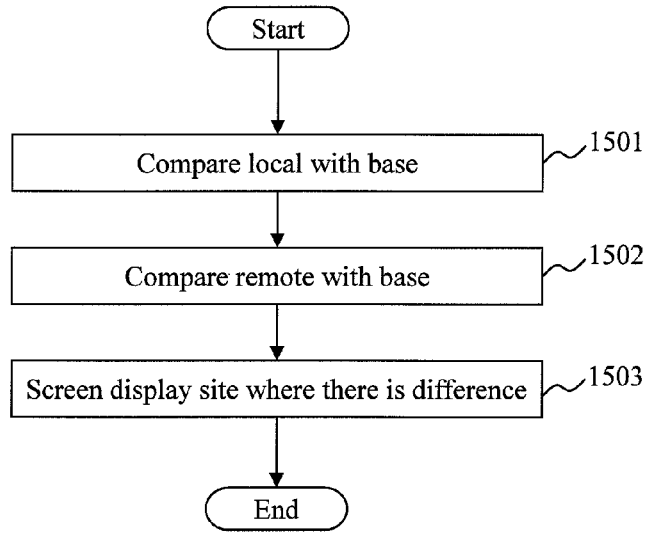
FIG. 15 illustrates an example of the processing to retrieve the difference between a local copy of a software component database in the software component database management client and the software component database, in a database operation unit of the software component database management client according to the present invention.

FIG. 15 illustrates an example of the processing to detect and to display an outgoing modification and incoming modification of the software component database 121. The software component database manager 150A inputs an instruction to execute the processing to detect an outgoing and incoming modifications of the software component database 121 at the software component database management client 150. Thereby, the database operation unit 151 of the software component database management client 150 performs the following processing. At step 1501, the database operation unit 151 compares the local copy 152 with the base copy 153 to detect an outgoing modification from the difference therebetween. Next, at step 1502, the database operation unit 151 compares the software component database 121 with the base copy 163 to detect an incoming modification from the difference therebetween. Lastly, at step 1503, the database operation unit 151 displays a screen as shown in FIG. 16.

Figure 16:
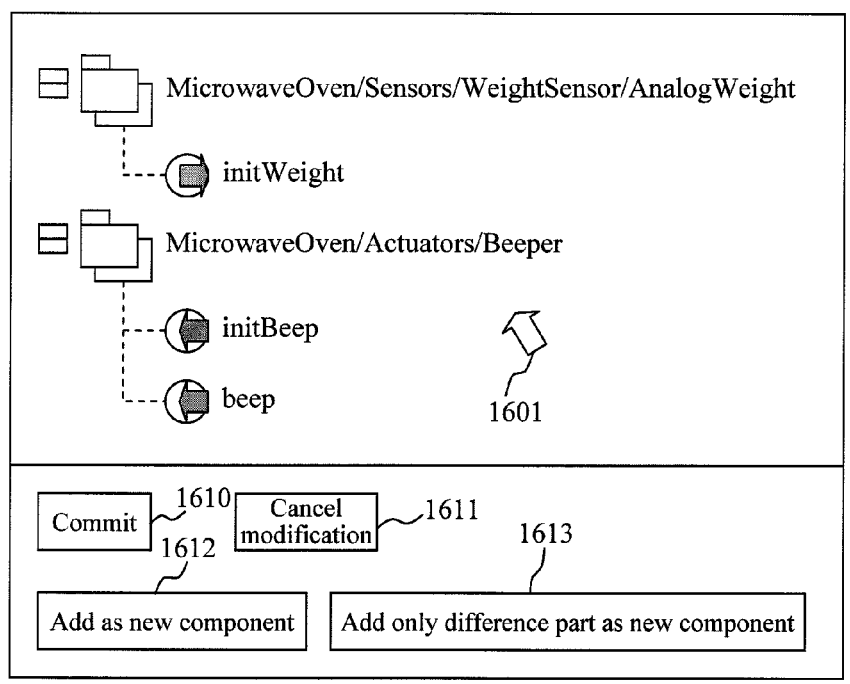
FIG. 16 illustrates a screen example to display the result of retrieval of the difference between a local copy of a software component database in the software component database management client and the software component database, in the database operation unit of the software component database management client according to the present invention.

FIG. 16 illustrates an example of the screen to indicate the detection result of an outgoing and incoming modifications of the software component database 121. The screen of FIG. 16 is created by the database operation unit 151 at step 1503 of FIG. 15. This example indicates that an outgoing modification has been detected in a software component ID "initWeight", which is attached to the node indicated by a path "MicrowaveOven/Sensors/WeightSensor/AnalogWeight", of the local copy 152. As illustrated, a rightward arrow indicates an outgoing modification. Moreover, the figure indicates that incoming modifications have been detected in software component IDs "initBeep" and "beep" which are attached to the node indicated by a path "MicrowaveOven/Actuators/Beeper" of the software component database 121 shown in FIG. 3. As illustrated, a leftward arrow indicates an incoming modification.

On the screen shown in FIG. 16, the software component database manager 150A designates a software component ID "initWeight" with the mouse pointer 1601 and instructs details display, for example, a screen as shown in FIG. 12 is displayed.

Figure 17:
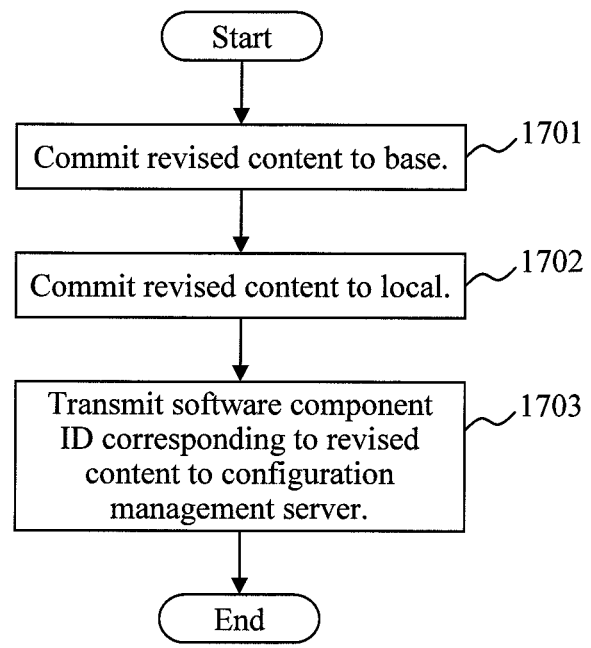
FIG. 17 illustrates an example of the processing to commit a revised content in a software component database to the local copy of the software component database in the database operation unit of the software component database management client according to the present invention.

When, on the screen shown in FIG. 16, the software component database manager 150A designates the software component for which an incoming modification has been made with a mouse pointer 1601 and to press a commitment button 1610, the database operation unit 151 instructs the software configuration management system to execute the processing shown in FIG. 17.

FIG. 17 illustrates an example of the processing in the database operation unit 151 when an incoming modification of the software component database 121 is committed to the local copy 152, the base copy 153, and the software product 133. The processing of FIG. 17 is executed by the database operation unit 151 of the software component database management client 150 when a software component for which an incoming modification has been made is designated on the screen of FIG. 16 and a commitment button 1610 is pressed. At step 1701, the database operation unit 151 retrieves the latest content of the designated software component from the component database 121 and commits it to the base copy 153. Next, at step 1702, the database operation unit 151 retrieves the latest content of the designated software component from the software component database 121, and commits it to the local copy 152. At step 1703, the database operation unit 151 transmits the designated Software component ID and the content of the software component to the software configuration management server 100. The product operation IF 114 of the software configuration management server 100 receives the Software component ID and the content of the software component transmitted from the software component database management client 150. Next, the synchronization unit 112 of the software configuration management server 100 commits the revised content of the software component to the software product 133 stored in the software product management unit 130 according to the processing shown in FIG. 18.

Figure 18:
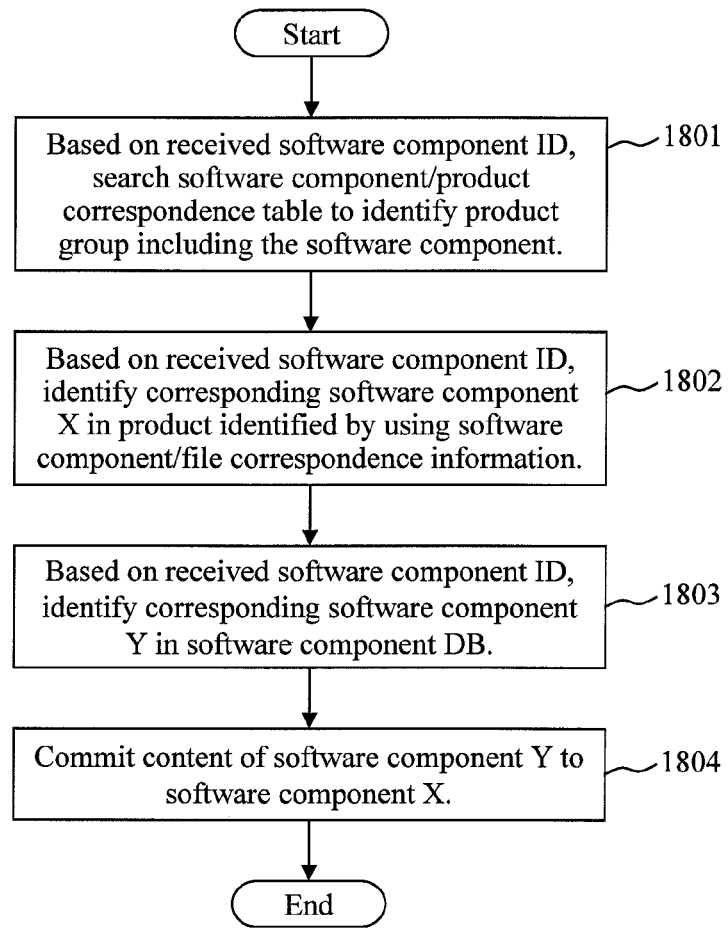
FIG. 18 illustrates an example of the processing to commit a revised content in a software component database to the software component database in the synchronization unit of the software configuration management server according to the present invention.

FIG. 18 illustrates an example of the processing to commit an incoming modification of the software component database 121 to the software product 133 stored in the software product management unit 130. That is, the process to commit a modification of the software product 131 stored in the software product management unit 130 to other software products 133 is shown. This processing is executed by the synchronization unit 112 of the software configuration management server 100. First, at step 1801, the synchronization unit 112 searches the software component/product correspondence table 122 with a software component ID transmitted from the software component database management client 150 as the search key. Thereby, all the software products including the received software component ID are detected. Next, steps 1802 to 1804 are executed on each software product. At step 1802, the software component/file correspondence information 132, 134 is searched with the received software component ID as the search key. Thereby, a software component "X" included in each software product is identified.

Next, at step 1803, the software component database 121 is searched with the received software component ID as the search key. Thereby, a software component "Y" having the received software component ID of the software components stored in the software component database 121 is identified. At step 1804, the content of the software component "Y" is committed to the software component "X".

According to the present invention, the software product developer 164A can know a revision made on the software component database 121 as an incoming modification through the screen as shown in FIG. 11. The synchronization unit 112 performs the processing to commit an incoming modification of the software component database 121 to other software products 133 stored in the software product management unit 130.

Figure 19:
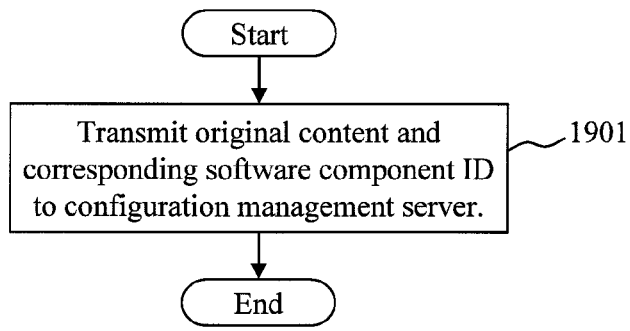
FIG. 19 illustrates an example of the processing to cancel a revision in the software component database in the database operation unit of the software component database management client according to the present invention.

When, on the screen shown in FIG. 16, the software component database manager 150A designates a software component for which an incoming modification has been made with a mouse pointer 1601 and presses a modification cancel button 1611, the database operation unit 151 instructs the software configuration management system to execute the processing shown in FIG. 19.

FIG. 19 illustrates an example of the processing to cancel an incoming modification of the software component database 121 caused by a modification of the software product 131, and to commit an outgoing modification. At step 1901, the database operation unit 151 of the software component database management client 150 transmits the content of the software component and its software component ID in the local copy 152 to the software configuration management server 100. The database operation IF 111 of the software configuration management server 100 receives the content of the software component and its software component ID in the local copy 152.

Figure 20:
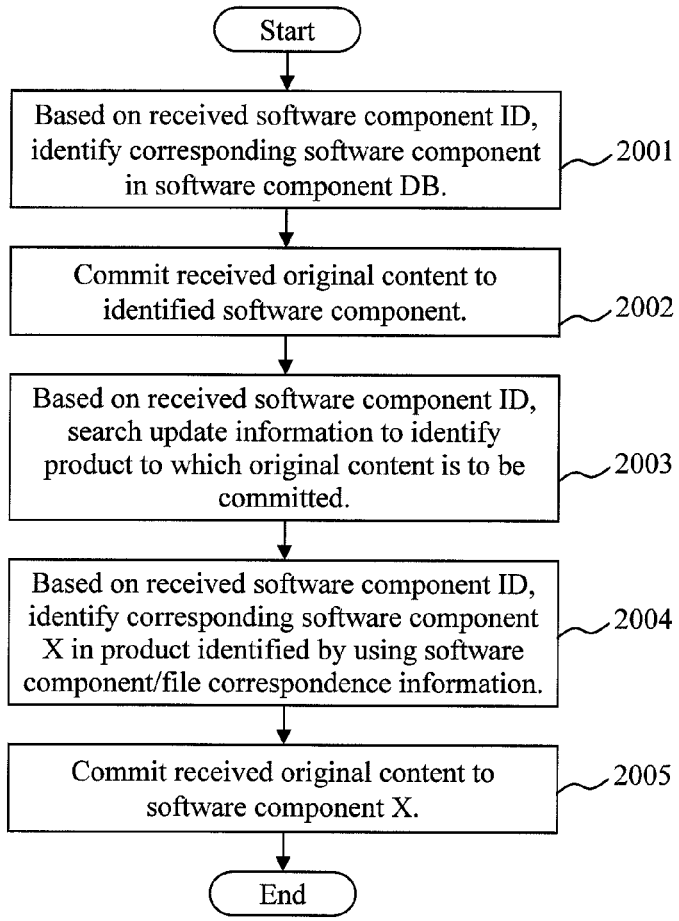
FIG. 20 illustrates an example of the processing to cancel a revision in the software component database in the synchronization unit of the software configuration management server according to the present invention.

The synchronization unit 112 executes the processing shown in FIG. 20 and cancels the modification. That is, the software configuration management system of the present invention overwrites the software component in the software component database 121 with the content of the local copy 152. Therefore, an incoming modification of the software component stored in the software component database 121 caused by a modification of the software product 131 is cancelled. Moreover, the software component database 121 is committed with the content of the local copy 152, that is, an outgoing modification of the software component.

FIG. 20 illustrates an example of the processing to cancel an incoming modification of the software component database 121 caused by a modification of the software product 131 and commit an outgoing modification. At step 2001, the synchronization unit 112 searches the software component database 121 with the received software component ID as the search key. Thereby, all the software components corresponding to the software component ID are retrieved. Next, at step 2002, the content of the software component in the received local copy 152 is committed to the retrieved software components. Next, at step 2003, the update information 123 is searched with the received software component ID as the search key. Thereby, the software product which has made a modification to the received software component ID for the last time is identified. At step 2004, the software component/file correspondence information is searched with the received software component ID as the search key. Thereby, a corresponding software component "X" included in the software product is identified. Lastly, at step 2005, the content of the received software component is committed to the software component "X". As so far described, the software product developer 160A can know the cancelling of the modification of the software component database 121 created by the software component database management client 150 as an incoming modification through the screen as shown in FIG. 11.

Figure 21:
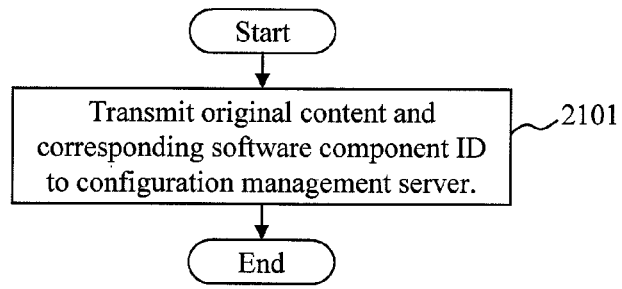
FIG. 21 illustrates an example of the processing to add a software component which is modified in the software component database to the software component database as a new software component, in the database operation unit of the software component database management client according to the present invention.

On the screen shown in FIG. 16, when the software component database manager 150A designates a software component, for which an incoming modification has been made, by using a mouse pointer 1601, and presses an "ADDITION AS NEW COMPONENT" button 1612, the database operation unit 151 instructs the software configuration management system to execute the processing shown in FIG. 21.

FIG. 21 illustrates the processing to add a software component, for which an incoming modification has been made, to the software component database 121 as a new software component. That is, a software component, for which an incoming modification caused by modification of the software product 131 has been made, is added as a new software component.

At step 2101, the database operation unit 151 transmits the content of the software component in the local copy 152 designated by the software component database manager 150A, and the software component ID thereof to the software configuration management server 100. The correspondence table update unit 113 of the software configuration management server 100 performs the processing shown in FIG. 22.

Figure 22:
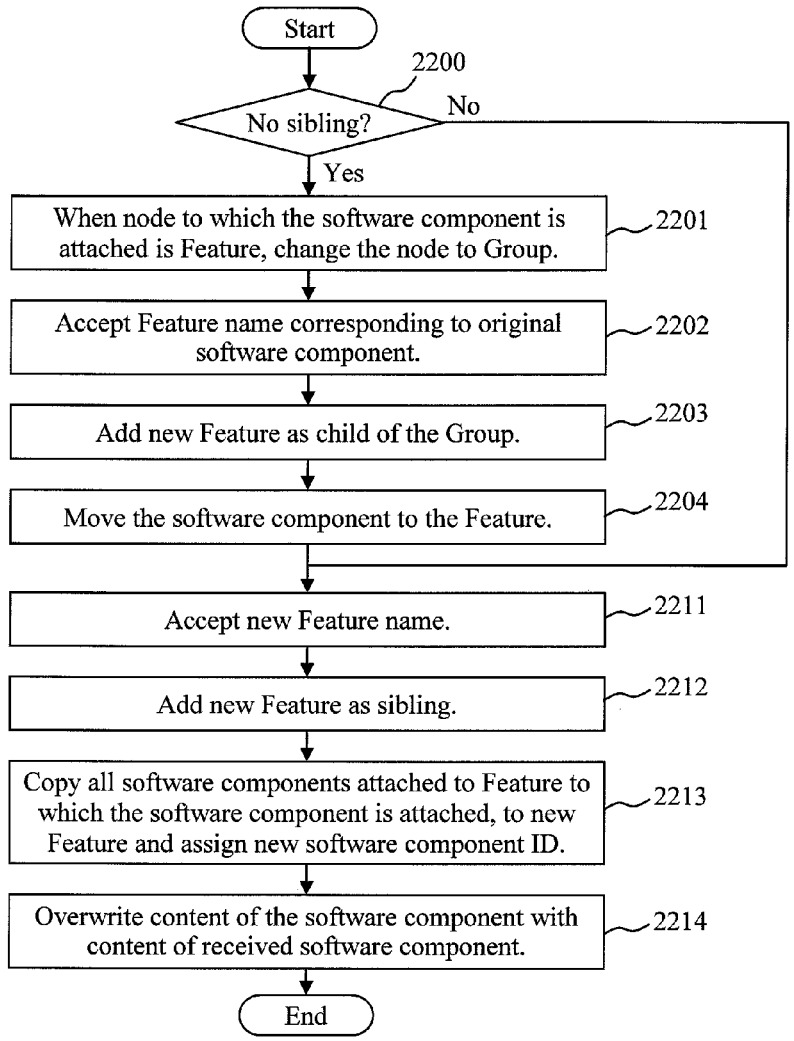
FIG. 22 illustrates an example of the processing to add a software component which is modified in the software component database to the software component database as a new software component, in a correspondence table update unit of the software configuration management server according to the present invention.
Figure 23:
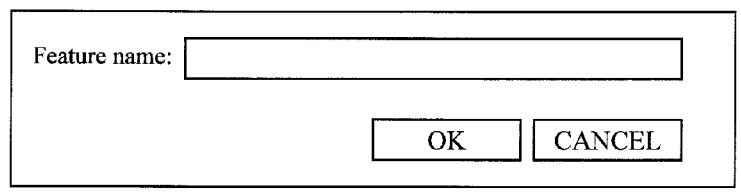
FIG. 23 illustrates a screen example to accept a node name when a new node is added in a logical tree making up the software component database, in the correspondence table update unit of the software configuration management server according to the present invention.
Figure 24:
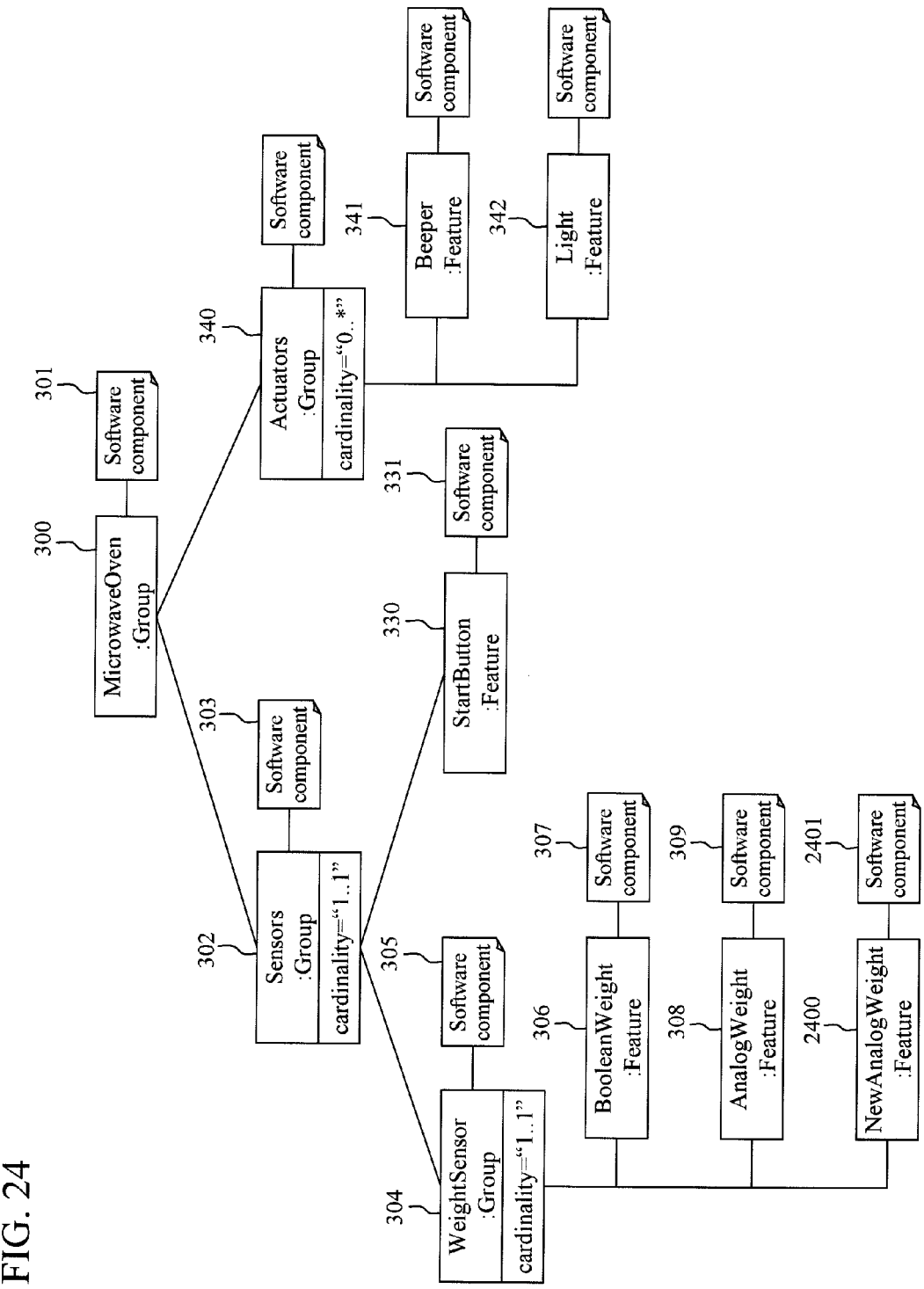
FIG. 24 illustrates an example of the addition of a new software component in the software component database of the software configuration management server according to the present invention.
Figure 25:
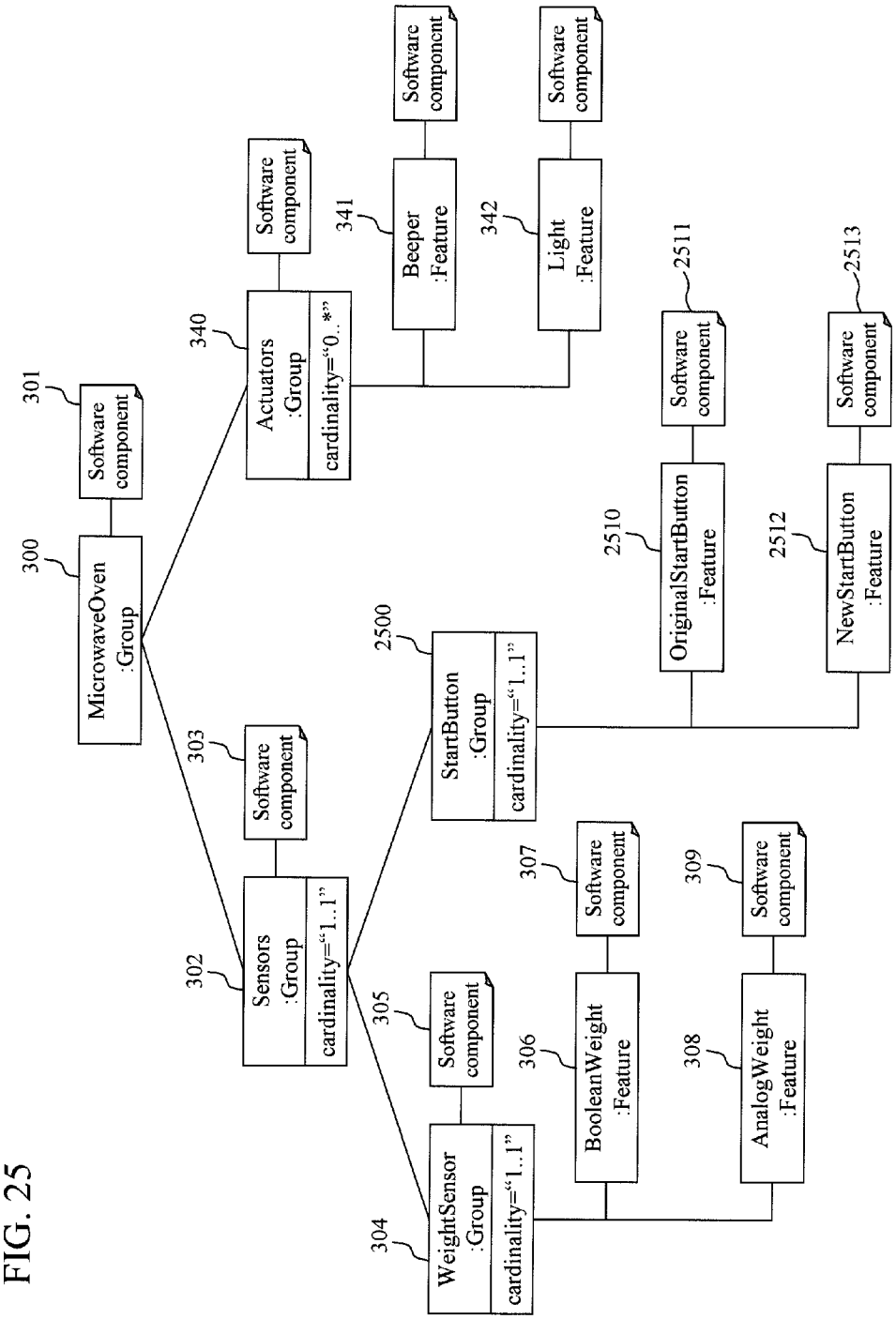
FIG. 25 illustrates an example of the addition of a new software component in the software component database of the software configuration management server according to the present invention.

Referring to FIGS. 22, 23, 24 and 25, an example of the processing in which the correspondence table update unit 113 duplicates a software component as a new software component and adds it to the software component database 121 will be described. Here, description will be made on a case in which a new software component is added to the data structure of the software component database 121 shown in FIG. 3. At step 2200, the correspondence table update unit 113 detects a corresponding software component in the software component database 121 with the received software component ID as the search key. Next, it is checked whether or not the node to which the detected software component is attached has a sibling node. When the concerned node has no sibling node, the process proceeds to step 2201, and when the concerned node has a sibling node, the process proceeds to step 2211. Here, description will be made on a case in which a software component 307 which has been attached to the node 306 of FIG. 3, or a software component 331 which has been attached to the node 330 is detected. In the case of the software component 307 of FIG. 3, since it has a sibling node, the process proceeds to step 2211. As a consequence, the result is as shown in FIG. 24. In the case of software component 331 of FIG. 3, since it has no sibling node, the process moves to step 2201. As a consequence, the result is as shown in FIG. 25.

At step 2201, when the node identified at step 2200 is of a "Feature" type, the same node is changed to a "Group" type. When the node identified at step 2200 is of a "Group" type, the process moves on to the next step. Since the node 330 of FIG. 3 is of a "Feature" type, it is changed to a "Group" type. The node 330 of FIG. 3 is changed to a node 2500 in FIG. 25. At step 2202, the screen shown in FIG. 23 is displayed. In the screen shown in FIG. 23, an item is displayed in which the name of a new "Feature" type node is to be input. The software component database manager 150A inputs the name of a "Feature" type node thereinto. Thus, the correspondence table update unit 113 accepts the name of the "Feature" type node. Next, at step 2203, the new "Feature" type node is added as a child of the "Group" type node created at step 2201. In FIG. 25, a new "Feature" type node 2510 is attached. At step 2204, a software component attached to a "Group" type node is moved to the "Feature" type node which has been added at step 2203. In FIG. 25, the software component 331 of FIG. 3 is attached to the "Feature" type node which has been added as a software component 2511.

Next, at step 2211, a screen as shown in FIG. 23 is displayed. The software component database manager 150A inputs a name of a "Feature" type node thereto. The correspondence table update unit 113 accepts the name of the "Feature" type node. Next, at step 2212, the new "Feature" type node is added as a sibling of the sibling node identified at step 2200 or a new node added at step 2203. In FIG. 24, a new "Feature" type node 2400 is added. In FIG. 25, a new "Feature" type node 2512 is added.

At step 2213, a node to which a software component corresponding to the received software component ID is attached is detected. All of other software components attached to this node are copied to new node which has been added at step 2212, and are assigned new software component IDs, respectively.

In FIG. 24, while the content of the software component 309 attached to a node "AnalogWeight" 308 is that before the modification of the software product 131 which has been transmitted from the software component database management client 150 has been committed, the content of a new software component 2401 attached to the new node "NewAnalogWeight" 2400 is that after the modification of the software product 131 which has been transmitted from the software component database management client 150 has been committed. In FIG. 25, a software component 2511 attached to a new node "OriginalStartButton" 2510 is one before the modification of the software product 131 which has been transmitted from the software component database management client 150 has been committed. Moreover, the content of a new software component 2513 attached to a new node "NewStartButton" 2512 is that after the modification of the software product 131 which has been transmitted from the software product 131 has been committed.

Figures 28, 29:
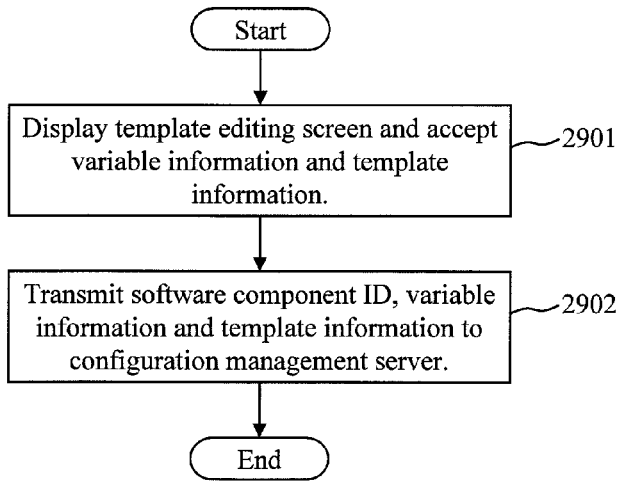
FIG. 28 illustrates an example of software component/file correspondence information updated by the correspondence table update unit in the software configuration management server according to the present invention.
FIG. 29 illustrates an example of the processing to add only a difference part to the software component database as a new software component for the software component modified in the software component database, in the database operation unit of the software component database management client according to the present invention.

Referring to FIGS. 26, 27 and 28, the processing in which the correspondence table update unit 113 updates the software component/product correspondence table 122 and the software component/file correspondence information 132,134 resulting from a modification of the software product 131. FIG. 27 shows the result of updating the software component/product correspondence table 122 shown in FIG. 6.

At step 2601, the correspondence table update unit 113 first searches update information 123 based on the received software component ID to identify the ID of the software product 131 which has made a modification to the corresponding software component for the last time. The software product 131 should include new software components.

At step 2602, a column for the new software component ID which is assigned at step 2213 of FIG. 22 is added for the software component/product correspondence table 122, and a software product ID is assigned. In the example of FIG. 27, "NewAnalogWeight/initWeight" 2703 and "NewAnalogWeight/getWeight" 2704 are added as IDs for new software components.

Next, at step 2603, the above described software product ID is deleted from the column of former software component ID corresponding to a new software component ID. In the example of FIG. 27, the ID of the software product 131 "Product A" is deleted from the columns of the former software component ID "AnalowWeight/initWeight" 2701 and "AnalogWeight/getWeight" 2702.

Lastly, at step 2604, the software component/file correspondence information 132 corresponding to the software product 131 is updated based on the new software component ID.

FIG. 28 illustrates an example that the correspondence table update unit 113 has updated the software component/file correspondence information 132 shown in FIG. 9. In this example, the correspondence table update unit 113 updates the software component ID included in the annotation inserted in the head of the software component with a new software component ID.

According to the present invention, the software component database manager 150A instructs commitment of modifications of software components in the software product 131 to the software component database 121. Further, the software component database manager 150A instructs addition of modified software components in the software product 131 to the software component database 121 as new software components.

Thereby, the software configuration management system of the present invention automatically modifies the tree structure of the software component database 121 and updates the software component/file correspondence information 132 corresponding to the software component/product correspondence table 122 and the software product 131. Therefore, modifications of software components are surely committed mutually between software components and software product groups.

According to the present invention, it is possible to maintain the mutual commitment of modifications of software components between the software component database 121 and all the software product groups in the software product management unit 130.

Now, description will be made referring to FIGS. 29 and 30. In FIG. 16, when the software component database manager 150A designates a software component, for which an incoming modification has been made, by using a mouse pointer 1601 and presses an "ADD ONLY DIFFERENCE PART AS NEW COMPONENT" button 1613, the software configuration management system of the present invention executes the processing of FIG. 29. That is, former software components are deleted, and a new software component group with the designated difference part as a variable and with a common part as a template is added to the software component database 121.

Figure 30:
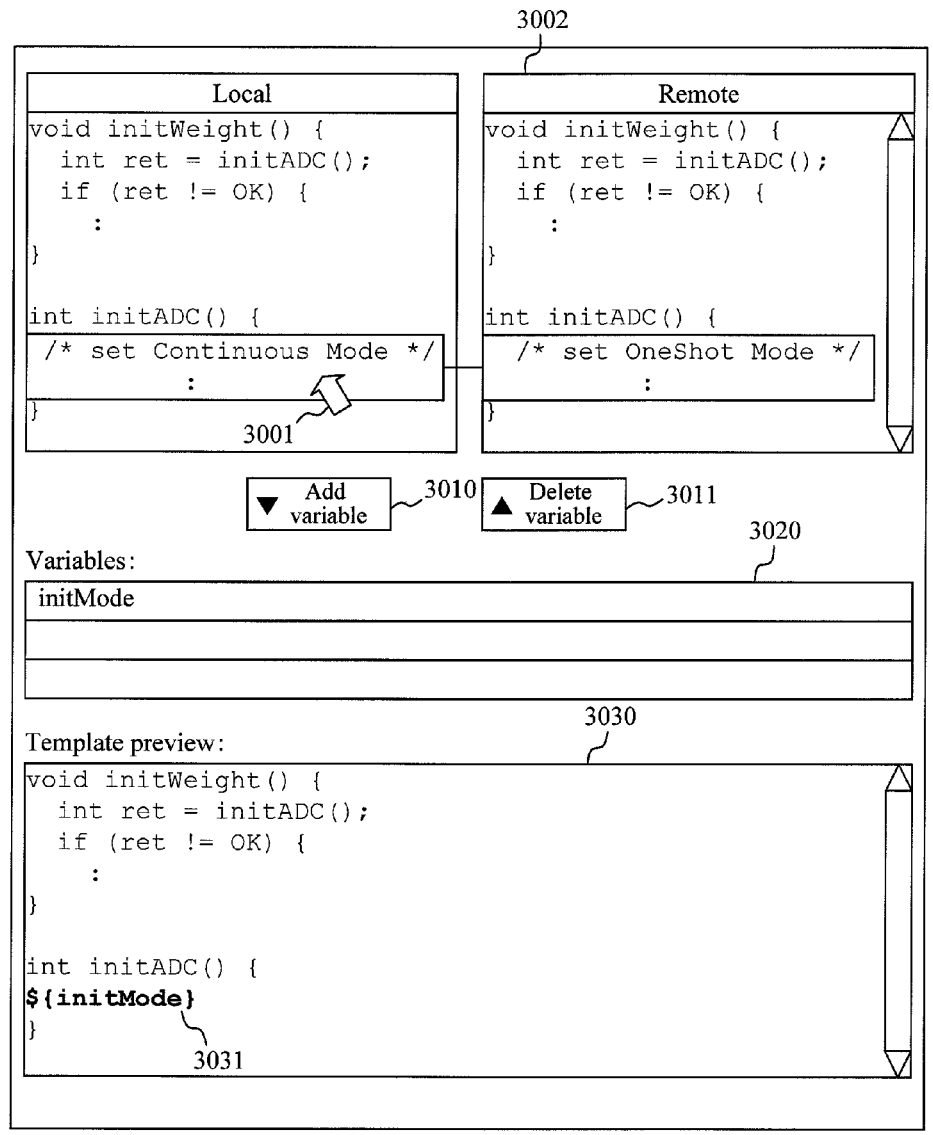
FIG. 30 illustrates an example of a template editing screen in the database operation unit of the software component database management client according to the present invention.

At step 2901, the database operation unit 151 displays the template editing screen shown in FIG. 30. The database operation unit 151 accepts a template and a plurality of variable information from the software component database manager 150A via the template editing screen.

Now, description will be made referring to FIG. 30. On the left side of a difference part display region 3002 of the template editing screen, the content of software components in the local copy corresponding to the designated software component will be displayed. On the right side of the difference part display region 3002 of the template editing screen, software components in the software component database will be displayed. Moreover, a difference part will be displayed with a color different from that of the background. When the difference part is selected with a mouse pointer 3001 and a variable addition 3010 button is pressed, new variables are added in a variable list table 3020 and inputs of variable names are accepted. In this example, "initMode" is being input as the variable name. A plurality of variables can be accepted. Further, in a template preview region 3030, the content of the template is displayed with variable parts 3031 being highlighted. In this example, the variable part 3031 is represented as "${initMode}". This is based on the template syntax of Velocity (http://jakarta.apache.org/velocity/) which is a template engine.

It is noted that each variable information includes both text strings in the local copy 152 corresponding to a variable name and a difference part, and text strings in the software component database 121. Hereafter, text strings in the local copy 152 included in the variable information are referred to as former variables, and text strings in the software component database 121 are referred to as new variables.

At step 2902, the database operation unit 151 transmits an accepted variable and template along with a software component ID corresponding to the designated software component to the software configuration management server 100. The correspondence table update unit 113 of the software configuration management server 100 performs the processing shown in FIG. 31.

Figure 31:
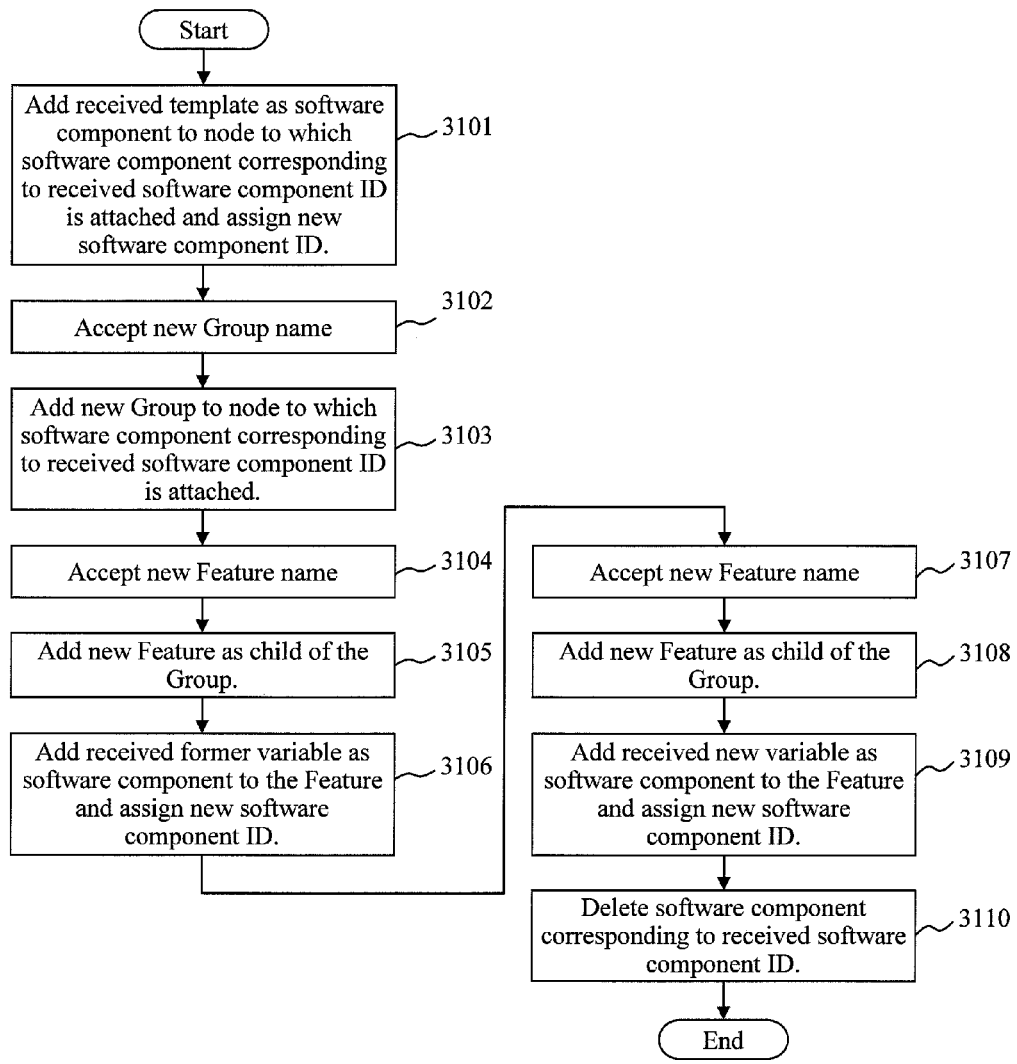
FIG. 31 illustrates an example of the processing to add only a difference part to the software component database as a new software component for the software component modified in the software component database, in the correspondence table update unit of the software configuration management server according to the present invention.
Figure 32:
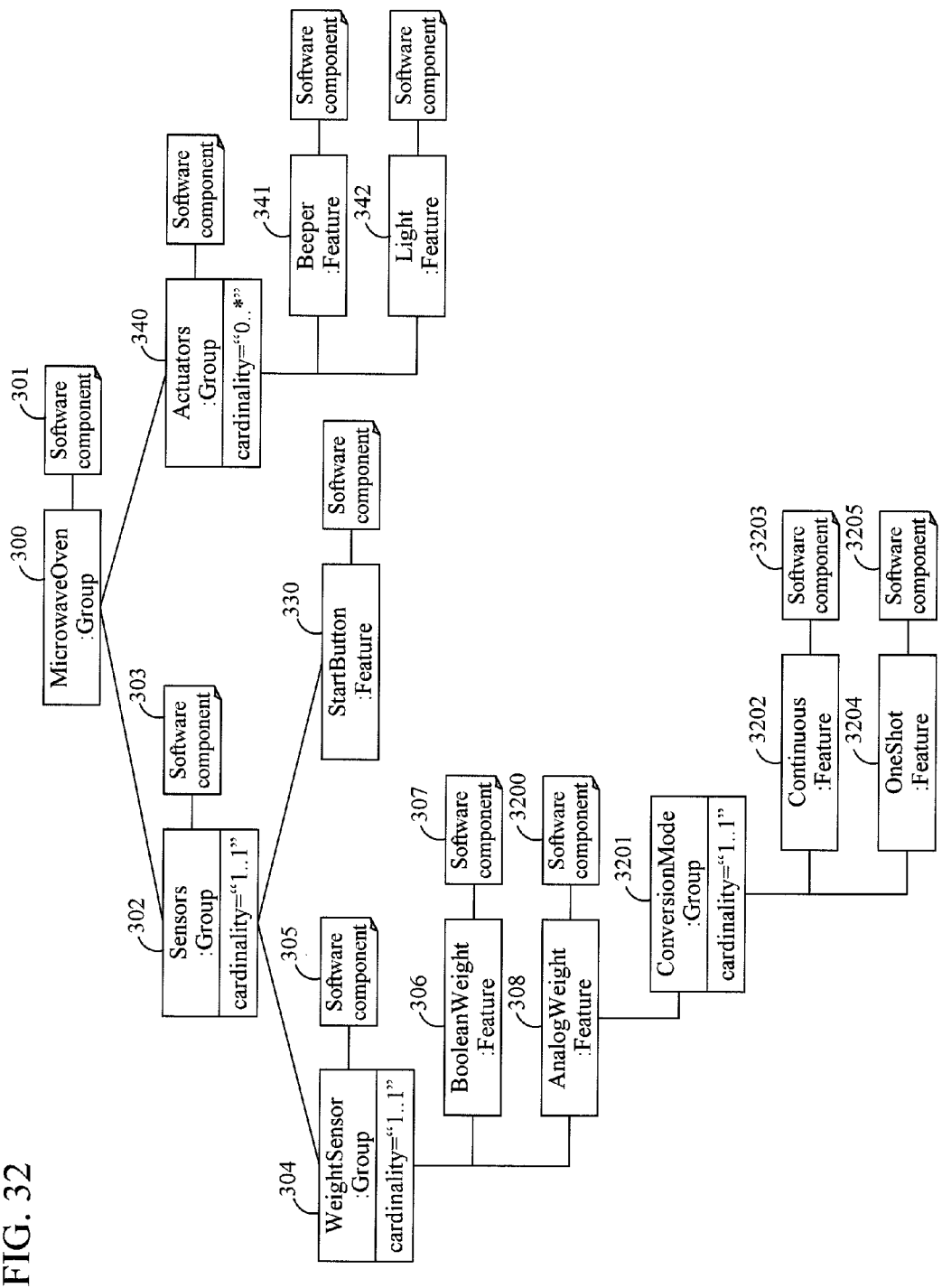
FIG. 32 illustrates an example in which only a difference part is added to the software component database as a new software component for the software component modified in the software component database, in the software component database of the software configuration management server according to the present invention.

Referring to FIGS. 31 and 32, the processing that the correspondence table update unit 113 adds a variable and a template to the software component database 121 as a new software component will be described. Here, description will be made by taking an example in which a variable and template are added to the data structure of the software component database 121 shown in FIG. 3 as a new software component. The software configuration management server 100 receives a variable and a template from the software component database management client 150 via a database operation IF 111.

First, at step 3101, the correspondence table update unit 113 identifies a corresponding software component in the software component database 121 based on the received software component ID. To the node which is attached to the software component, the received template is added as a new software component, and a new software component ID is assigned. In the example of FIG. 32, a new software component 3200 is added to a node "AnalogWeight" 308 as a template.

Next, steps 3102 to 3109 are executed for each received variable information. First, at step 3102, the screen shown in FIG. 23 is displayed to accept a new "Group" type node name. Next, at step 3103, a new "Group" type node, which has the accepted node name, is added as a child to the node to which a template is attached. In the example of FIG. 32, a new node "ConversionMode" 3201 is attached to the node 308. Next, at step 3104, the screen shown in FIG. 23 is displayed to accept a new "Feature" type node name. Next, at step 3105, a new "Feature" type node, which has the accepted node name, is added as a child to the node which has been added at step 3102. In the example of FIG. 32, a "Continuous" node 3202 is added. Next, at step 3106, to this node, a received former variable is added as a new software component, and a new software component ID is assigned, respectively. In the example of FIG. 32, a new software component 3203 is added. Next, at step 3107, the screen shown in FIG. 23 is displayed to accept a new "Feature" type node name. Next, at step 3108, a new "Feature" type node, which has the accepted node name, is added as a child to the node which has been added at step 3102. In the example of FIG. 32, a "OneShot" node 3204 is added. Next, at step 3109, to this node, the received new variable is added as a new software component and a new software component ID is assigned, respectively. In the example of FIG. 32, a new software component 3205 is added. Lastly, at step 3110, the software component corresponding to the received software component ID is deleted from the software component database 121. In the example of FIG. 32, the software component 309 which had been attached to a node "AnalogWeight" 308 is deleted.

FIG. 32 shows the result of the correspondence table update unit 113 adding a variable and template to the component database 121 as a new software component. In this example, in place of the software component 309 which is attached to the node "AnalogWeight" 308, a new software component 3200 is attached as a template. As a variable, new software components 3203, 3205 are attached. Therefore, two software products are represented: those are a new software product with the software component 3200 as a template and with software component 3203 as a modified part, and a new software product with the software component 3200 as a template and with the software component 3205 as a modified part.

Figure 33:
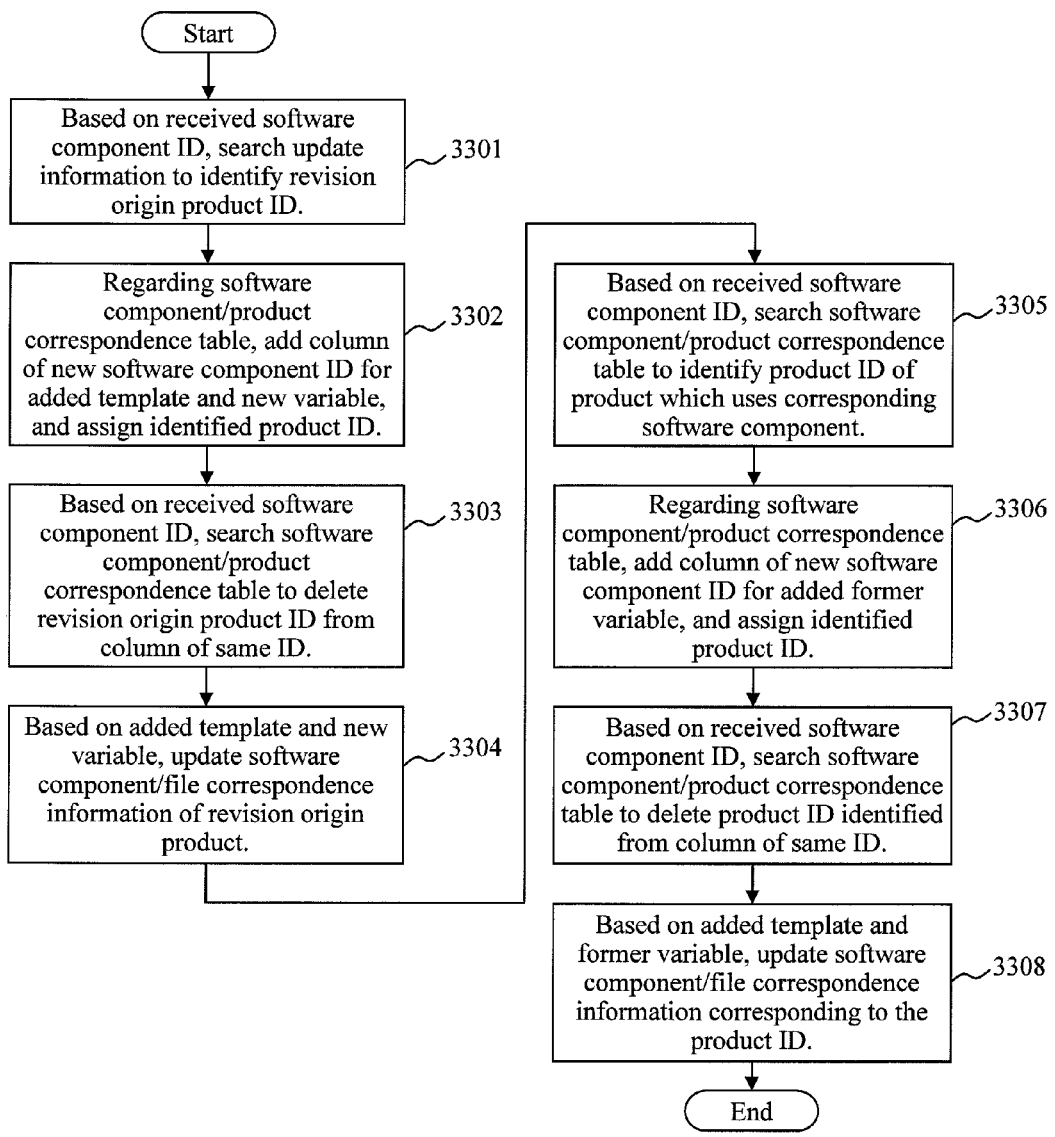
FIG. 33 illustrates an example of the processing to add only a difference part to the software component database as a new software component for software components modified in the software component database, in the correspondence table update unit of the software configuration management server according to the present invention.

Referring to FIGS. 33, 34 and 35, the processing that the correspondence table update unit 113 updates the software component/product correspondence table 122 and the software component/file correspondence information 132, 134 will be described. FIG. 34 shows the result of updating the software component/product correspondence table 122 shown in FIG. 6.

At step 3301, the correspondence table update unit 113, first, searches the update information 123 based on the received software component ID to identify the ID of the software product 131 which has made a modification to the corresponding software component for the last time. This software product 131 should include a source file in which a new variable and a template are combined. Then, at step 3302, a column of the new software component ID which has been added at steps 3103 and 3109 shown in FIG. 31 is added to the soft component/product correspondence table 122 and the above described software product ID is assigned. In the example of FIG. 33, the columns of new software component IDs 3410, 3411 and 3412 are added. Next, at step 3303, the above described software product IDs are deleted from the columns of the received software component ID in the soft component/product correspondence table 122. In the example of FIG. 34, the IDs "Product A" and "Product B" of the software products A and B are deleted from the column 3401 of the ID "AnalogWeight/initWeight" of the former software component corresponding thereto.

Next, at step 3304, based on the contents of the added template and new variable and new software component IDs thereof, the software component/file correspondence information 132 corresponding to the above described software product 131 is updated. Next, at step 3305, the software component/product correspondence table 122 is searched with the received software component ID as a key, the ID of the software product group which uses corresponding software components is identified. The same software product group will include a source file in which a former variable and a template are combined. Then, at step 3306, a column of the new sort component ID which has been added at step 3106 shown in FIG. 31 is added to the soft component/product correspondence table 122 and the ID of the above described software product group is assigned.

Then, at step 3307, the ID of the above described software product group is deleted from the column of the received software component ID in the soft component/product correspondence table 122. In the example of FIG. 34, "Analog-Weight/ConversionMode/initWeightCommon" 3410 is added as a new software component ID corresponding to the template, "AnalogWeight/ConversionMode/Continuous/initWeight" 3411 as a new software component ID corresponding to the former variable, and "AnalogWeight/ConversionMode/OneShot/initWeight" 3412 as a new software component ID corresponding to a new variable.

Lastly, at step 3308, based on the contents of the added template and the former variable and the new software component IDs thereof, the software component/file correspondence information corresponding to the above described software product group is updated.

FIG. 35 illustrates an example that the correspondence table update unit 113 has updated the software component/file correspondence information 132 shown in FIG. 9. In this example, the correspondence table update unit 113 has updated the software component ID included in the annotation inserted at the head of the software component with a new software component ID corresponding to the template. Moreover, new annotations are inserted at the head and tail of the variable portion, and a new software component ID corresponding to a new variable or former variable is included in the annotation inserted at the head.

According to the present invention, the software component database manager 150A instructs addition of only a modified part of the software component as a new software component to the software component database 121.

Thereby, the software configuration management system of the present invention automatically modifies the tree structure of the software component database 121 and updates the software component/file correspondence information 132 corresponding to the software component/product correspondence table 122 and the software product 131. Therefore, modifications of software components are surely committed mutually between software components and software product groups.

According to the present invention, it is possible to maintain the mutual commitment of modifications of software components between the software component database 121 and all the software product groups in the software product management unit 130.

According to the present invention, even when a new software component is added to a software component database, or a software component is divided, it is possible to surely commit revisions made on a software component to the software component database and the software product group created from the database. Further, it is possible to create a new software product from the software component database. As a result, even when the numbers of software components and software products increase extensively, configuration management of the software component database and the software product groups is made possible, thereby improving the efficiency of the development of software products.

INDUSTRIAL APPLICABILITY

According to the present invention, it is possible to store not only software but also any text document with a modular structure in a software component database and, based thereon, to automatically configure text files of a new document. Further, maintenance and management of such software component database is possible.

The invention claimed is:

1. A software configuration management system managing a source file for making up a software product and a software component that is a constituent element of the source file, the software configuration management system comprising:
   a software component database constructed at least in part of storage hardware and configured to store the software component in correspondence with a tree node that manages a software product as a tree structure and that makes up the tree structure;
   a software component database management unit constructed at least in part of at least one of a hardware processor and circuitry, and configured to store a software component/product correspondence table which is a piece of information that indicates the relationship between a software component and a software product including the software component for all the software components stored in the software component database, and to store update information which is a piece of information regarding an update for a software component stored in the software component database, the update performed on the basis of an update for a software product;
   a software product management unit constructed at least in part of at least one of a hardware processor and circuitry, and configured to store a plurality of software products created by combining software components stored in the software component database, and to store software component/file correspondence information which is a piece of information that indicates the relationship between a software component included in the software product and a source file for each of the plurality of software products stored in the software product management unit;
   a database operation interface unit constructed at least in part of at least one of a hardware processor and circuitry, and configured to receive an instruction from an external software component database management client computer, and to operate the software component database management unit according to the instruction;
   a product operation interface unit constructed at least in part of at least one of a hardware processor and circuitry, and configured to receive an instruction from an external software product operation client computer, and to operate the software product management unit according to the instruction;
   a synchronization unit constructed at least in part of at least one of a hardware processor and circuitry, and configured to commit a modification of a software component stored in the software component database to a software product stored in the software product management unit, or commit a modification of a software product stored in the software product management unit to a software component stored in the software component database and other software products stored in the software product management unit, based on the software component/product correspondence table and the software component/file correspondence information according to an instruction from the software component database management client computer or the software product operation client computer; and
   a correspondence table update unit constructed at least in part of at least one of a hardware processor and circuitry, and configured to update the software components stored in the software component database, the software component/product correspondence table, the update information, and the software component/file correspondence information in response to an instruction from the software component database management client computer;
   wherein
   the synchronization unit is configured to, upon receiving an instruction from the software product operation client computer to commit a modification of a source file of a software product stored in the software product management unit into a software component stored in the software component database, detect a software component corresponding to the modified portion of the source file by searching the software component/file correspondence information, detect all of software products including the detected software component among software components stored in the software component database by searching the software component/product correspondence table, and commit the modification of the source file into a software component included in the detected software product;
   and wherein
   the synchronization unit is configured to, upon receiving an instruction from the software product operation client computer to commit a modification of a source file of a software product stored in the software product management unit into other software products stored in the software product management unit, detect a software component corresponding to the modified portion of the source file by searching the software component/file correspondence information, detect all of software products including the detected software component among software products stored in the software product management unit by searching the software component/product correspondence table, and commit the modification of the source file into a software component included in the detected software product.

2. The software configuration management system according to claim 1, wherein
   upon receiving from the software component database management client computer a command to add a software component, which has been modified due to commitment of a modification of a software product stored in the software product management unit, out of the software components stored in the software component database, to the software component database as a new software component, the correspondence table update unit is configured to:
   accept a new node name and, on the tree structure of the software component database, and
   add a new node that has the new node name to a position of a node which is in sibling relation with a node corresponding to the modified software component, thereby making the modified software component correspond to a first node among a plurality of the node in the sibling relation, and making the software component before the modification of the software component correspond to a second node among a plurality of the node in the sibling relation.

3. The software configuration management system according to claim 1, wherein
   upon receiving from the software component database management client computer a command to add a first software component, which has been modified due to commitment of a modification of a software product stored in the software product management unit, out of the software components stored in the software component database, to the software component database as a second software component that is a new software component, the correspondence table update unit is configured to:

identify the software product based on the updated first software component;

record the correspondence between the second software component and the software product in the software component-product correspondence table;

delete the correspondence between the first software component and the software product from the software component/product correspondence table; and perform updating on the software component/file correspondence information corresponding to the software product so that the second software component can be identified from a source file in which the second software component is combined.

4. The software configuration management system according to claim 1, wherein upon receiving from the software component database management client computer a command to add only a modified part of the software component, which has been modified due to commitment of a modification of a software product stored in the software product management unit, out of the software components stored in the software component database, to the software component database as a new software component, the correspondence table update unit is configured to:

accept a first, a second, and a third new node names;

add, on the tree structure of the software component database, adds a first new node having the first new node name to a position of a node which is in child relation with a node corresponding to the modified software component;

add a second new node having the second new node name to a position of a node which is in child relation with the first new node;

add a third new node having the third new node name to a position of a node which is in child relation with the first new node;

add a new software component including a common part different from the modified part as a template in correspondence with a node corresponding to the modified software component;

add a new software component, in which a part of the modified part corresponding to before modification is configured to be a variable which can be inserted into the template, in correspondence with the second new node;

add a new software component, in which a part of the modified part corresponding to after modification is configured to be a variable which can be inserted into the template, in correspondence with the third new node; and delete the software component from the tree structure of the software component database.

5. The software configuration management system according to claim 1, wherein upon receiving an instruction from the software component management client computer to add, regarding the software component modified due to commitment of a modification of a software product stored in the software product management unit out of the software components stored in the software component database, a common part before or after modification to the software component database as a first new software component, and to add modified parts before and after modification to the software component database as second and third new software components, respectively, the correspondence table update unit is configured to:

identify the software product based on the modified software component;

record the correspondences between the first, second and third new software components and the software product in the software component/product correspondence table;

delete the correspondence between the modified software component and the software product from the software component/product correspondence table; and perform updating on the software component/file correspondence information corresponding to the software product so that the first and third new software components can be identified from a source file in which the first and third new software components are combined.

6. The software configuration management system according to claim 1, wherein when the correspondence table update unit receives from the software component database management client computer a command to add only a modified part of a software component relating to the software component which has been modified due to commitment of a modification of a software product stored in the software product management unit, out of the software components stored in the software component database, to the software component database as a new software component, the correspondence table update unit is configured to:

accept a portion of a variable from the software component database management client computer to add a new software component with a common part different from the modified part as a template and with a part of the modified part as the variable which can be inserted into the template in the tree structure of the software component database.

7. A method of managing effected by a software configuration management system managing a source file for making up a software product and a software component that is a constituent element of the source file, the software configuration management system comprising:

a software component database constructed at least in part of storage hardware and configured to store the software component in correspondence with a tree node that manages a software product as a tree structure and that makes up the tree structure;

a software component database management unit constructed at least in part of at least one of a hardware processor and circuitry, and configured to store a software component/product correspondence table which is a piece of information that indicates the relationship between a software component and a software product including the software component for all the software components stored in the software component database, and to store update information which is a piece of information regarding an update for a software component stored in the software component database, the update performed on the basis of an update for a software product;

a software product management unit constructed at least in part of at least one of a hardware processor and circuitry, and configured to store a plurality of software products created by combining software components stored in the software component database, and to store software component/file correspondence information which is a piece of information that indicates the relationship between a software component included in the software product and a source file for each of the plurality of software products stored in the software product management unit;

a database operation interface unit constructed at least in part of at least one of a hardware processor and circuitry, and configured to receive an instruction from an external software component database management client computer, and to operate the software component database management unit according to the instruction;

a product operation interface unit constructed at least in part of at least one of a hardware processor and circuitry, and configured to receive an instruction from an external software product operation client computer, and to operate the software product management unit according to the instruction;

a synchronization unit constructed at least in part of at least one of a hardware processor and circuitry, and configured to commit a modification of a software component stored in the software component database to a software product stored in the software product management unit, or commit a modification of a software product stored in the software product management unit to a software component stored in the software component database and other software products stored in the software product management unit, based on the software component/product correspondence table and the software component/file correspondence information according to an instruction from the software component database management client computer or the software product operation client computer; and a correspondence table update unit constructed at least in part of at least one of a hardware processor and circuitry, and configured to update the software components stored in the software component database, the software component/product correspondence table, the update information, and the software component/file correspondence information in response to an instruction from the software component database management client computer;

wherein the synchronization unit performs the operations of:

upon receiving an instruction from the software product operation client computer to commit a modification of a source file of a software product stored in the software product management unit into a software component stored in the software component database, then detecting a software component corresponding to the modified portion of the source file by searching the software component/file correspondence information, detecting all of software products including the detected software component among software components stored in the software component database by searching the software component/product correspondence table, and committing the modification of the source file into a software component included in the detected software product; and upon receiving an instruction from the software product operation client computer to commit a modification of a source file of a software product stored in the software product management unit into other software products stored in the software product management unit, then detecting a software component corresponding to the modified portion of the source file by searching the software component/file correspondence information, detecting all of software products including the detected software component among software products stored in the software product management unit by searching the software component/product correspondence table, and committing the modification of the source file into a software component included in the detected software product.

8. The method of managing a software configuration management system according to claim 7, further comprising:

when a software product stored in the software product management unit is modified through the software product operation client computer, committing the modification to other software products stored in the software product management unit.

* * * * *